US012783280B2

(12) United States Patent
Li et al.

(10) Patent No.: US 12,783,280 B2
(45) Date of Patent: Nov. 3, 2026

(54) DISTRIBUTED DEVICE CAPABILITY VIRTUALIZATION METHOD, MEDIUM, AND ELECTRONIC DEVICE

(71) Applicant: HUAWEI TECHNOLOGIES CO., LTD., Shenzhen (CN)

(72) Inventors: Ming Li, Xi'an (CN); Linli Zhang, Shenzhen (CN); Lei Tong, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 597 days.

(21) Appl. No.: 18/446,289

(22) Filed: Aug. 8, 2023

(65) Prior Publication Data

US 2023/0385097 A1 Nov. 30, 2023

Related U.S. Application Data

(63) Continuation of application No. PCT/CN2021/143625, filed on Dec. 31, 2021.

(30) Foreign Application Priority Data

Feb. 9, 2021 (CN) ........................ 202110181148.X

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/45595* (2013.01)

(58) Field of Classification Search
CPC ............... G06F 9/45558; G06F 9/5077; G06F 2009/45595
See application file for complete search history.

(56) References Cited

U.S. PATENT DOCUMENTS

2004/0192443 A1* 9/2004 Stelzer .................... A63F 13/12
463/42
2018/0205770 A1* 7/2018 Joo ....................... H04L 65/403

FOREIGN PATENT DOCUMENTS

CN 110198534 A 9/2019
CN 111083364 A 4/2020
(Continued)

OTHER PUBLICATIONS

Li et al., "Towards a Personal Mobile Cloud via Generic Device Interconnections," IEEE Transactions on Mobile Computing, vol. 19, No. 12, IEEE Service Center, Los Alamitos,CA,US, XP011818230, Total 16 pages, Institute of Electrical and Electronics Engineers, New York, New York (Dec. 2020).
(Continued)

*Primary Examiner* — Wissam Rashid
(74) *Attorney, Agent, or Firm* — Leydig, Voit & Mayer, Ltd.

(57) ABSTRACT

A distributed device capability virtualization method, medium, and electronic device are provided. A first electronic device establishes a first-level communication relationship with a second electronic device, where the first-level communication relationship is used to indicate the first electronic device to provide a preset capability for the second electronic device; a third electronic device sends a second-level communication relationship establishment request to the second electronic device, where the second-level communication relationship establishment request is used by the third electronic device to obtain, from the second electronic device, authorization to use the preset capability by using the second electronic device; and the second electronic device may grant establishment of a second-level communication relationship and establish the second-level communication relationship with the third electronic device.

18 Claims, 15 Drawing Sheets

(56) References Cited

FOREIGN PATENT DOCUMENTS

| | | | |
|---|---|---|---|
| CN | 111752289 | A | 10/2020 |
| CN | 112181616 | A | 1/2021 |

OTHER PUBLICATIONS

Le et al., "Enabling multi-hop remote method invocation in device-to-device networks," Human-centric Computing and Information Sciences, vol. 9, No. 1, XP093172100, Total 22 pages (Jun. 5, 2019).

* cited by examiner

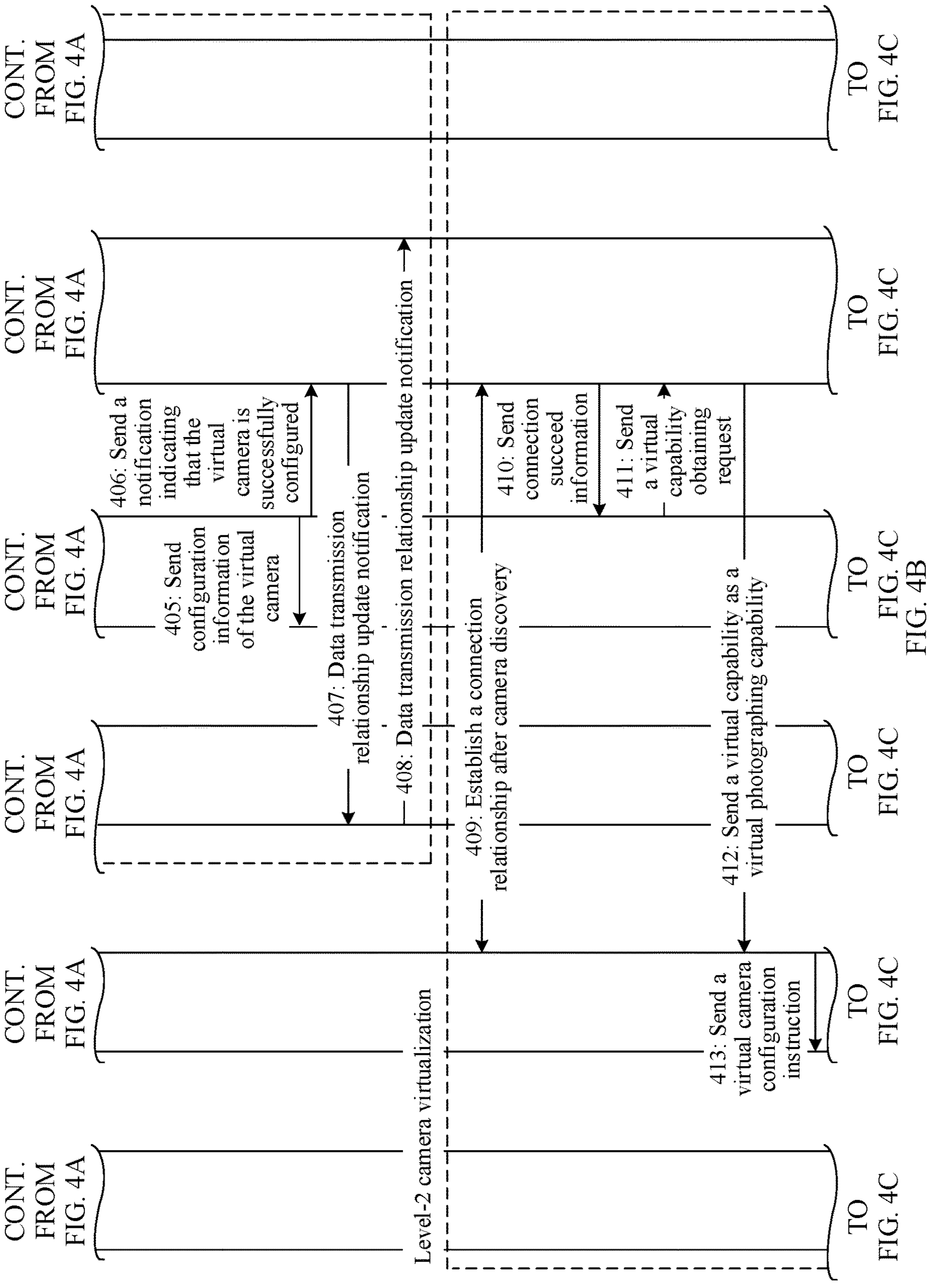
CONT. FROM FIG. 4A
CONT. FROM FIG. 4A
CONT. FROM FIG. 4A
CONT. FROM FIG. 4A
CONT. FROM FIG. 4A
CONT. FROM FIG. 4A
405: Send configuration information of the virtual camera
406: Send a notification indicating that the virtual camera is successfully configured
407: Data transmission relationship update notification
408: Data transmission relationship update notification
409: Establish a connection relationship after camera discovery
410: Send connection succeed information
411: Send a virtual capability obtaining request
412: Send a virtual capability as a virtual photographing capability
413: Send a virtual camera configuration instruction
Level-2 camera virtualization
TO FIG. 4C
TO FIG. 4C
TO FIG. 4C FIG. 4B
TO FIG. 4C
TO FIG. 4C
TO FIG. 4C

DISTRIBUTED DEVICE CAPABILITY VIRTUALIZATION METHOD, MEDIUM, AND ELECTRONIC DEVICE

CROSS-REFERENCE TO RELATED APPLICATIONS

This application is a continuation of International Application No. PCT/CN2021/143625 filed on Dec. 31, 2021, which claims priority to Chinese Patent Application No. 202110181148.X filed on Feb. 9, 2021. The disclosures of the aforementioned applications are hereby incorporated by reference in their entireties.

TECHNICAL FIELD

This application relates to the field of Internet of Things technologies, and in particular, to a distributed device capability virtualization method, a medium, and an electronic device.

BACKGROUND

Distributed device capability virtualization means that a component (for example, a camera, a microphone, or a speaker) of one of two different electronic devices is used as a virtual component of the other electronic device, so that electronic devices share a component capability (for example, a photographing capability, a sound pickup capability, or a sound play capability) in a distributed scenario. For example, a mobile phone uses a camera of a smart television to implement a video call. For another example, a mobile phone uses a screen of a tablet computer to display content, and uses a camera of the tablet computer to perform a video call.

In the conventional technology, component capability virtualization between only two electronic devices is supported. For example, a mobile phone uses a photographing capability of an unscrewed aerial vehicle to shoot a wide-angle video. However, in actual application, there is a requirement that two electronic devices need to use a same device capability of a same electronic device. For example, a plurality of mobile phones need to simultaneously use a photographing capability of a same unscrewed aerial vehicle to shoot a wide-angle video.

However, due to a structural performance limitation of an electronic device that provides a component capability, the electronic device that provides the component capability can be connected to only one electronic device, and the electronic device that provides the component capability cannot be simultaneously connected to a plurality of electronic devices and cannot transmit a plurality of pieces of same data obtained by using the component capability. Alternatively, an electronic device that provides a component capability is far away from another electronic device, and the electronic device that provides the component capability cannot be directly connected to the another electronic device through near field communication and cannot provide the component capability for the another electronic device, which affects user experience.

SUMMARY

Embodiments of this application provide a distributed device capability virtualization method, a medium, and an electronic device.

According to a first aspect, an embodiment of this application provides a distributed device capability virtualization method, and the method includes: A first electronic device establishes a first-level communication relationship with a second electronic device, where the first-level communication relationship is used to indicate the first electronic device to provide a preset capability for the second electronic device.

A third electronic device sends a second-level communication relationship establishment request to the second electronic device, where the second-level communication relationship request is used by the third electronic device to obtain, from the second electronic device, authorization to use the preset capability by using the second electronic device.

When the second electronic device grants, based on the second-level communication relationship request, establishment of a second-level communication relationship with the second electronic device to the third electronic device, the third electronic device establishes the second-level communication relationship with the second electronic device, where the second-level communication relationship is used to indicate the third electronic device to use the preset capability by using the second electronic device.

In this embodiment of this application, the preset capability may be a photographing capability, an audio play capability, an audio collection capability, or the like. The following uses a photographing capability as an example for description.

In this embodiment of this application, the first electronic device may be an unscrewed aerial vehicle, the second electronic device may be a mobile phone of an assistant of a live streamer, and the third electronic device may be a mobile phone of the live streamer.

When the first-level communication relationship is established between the unscrewed aerial vehicle and the mobile phone of the assistant of the live streamer, the unscrewed aerial vehicle may provide the photographing capability for the mobile phone of the assistant of the live streamer. To be specific, the mobile phone of the assistant of the live streamer may control a working status and a data transmission status that are of the unscrewed aerial vehicle.

When the second-level communication relationship is established between the mobile phone of the live streamer and the mobile phone of the assistant of the live streamer, the mobile phone of the assistant of the live streamer provides the photographing capability for the mobile phone of the live streamer. To be specific, the mobile phone of the live streamer may control the working status and the data transmission status that are of the unscrewed aerial vehicle by using the mobile phone of the assistant of the live streamer.

For example, the mobile phone of the assistant of the live streamer may obtain video data corresponding to a picture collected by the unscrewed aerial vehicle. When the assistant of the live streamer watches the video, the assistant of the live streamer may control the unscrewed aerial vehicle by using the mobile phone of the assistant of the live streamer, for example, adjusting a photographing field of view, a photographing angle, or the like of the unscrewed aerial vehicle, to select a better picture for the live streamer.

The live streamer may obtain, by using the mobile phone of the assistant of the live streamer, the video data shot by the unscrewed aerial vehicle, and shoot the live streamer by using a front-facing camera of the mobile phone of the live streamer. In addition, the mobile phone of the live streamer combines the video data obtained from the unscrewed aerial vehicle by using the mobile phone of the assistant of the live streamer and image data collected by a physical camera of the mobile phone of the live streamer, to implement dual-view live stream (two pictures are simultaneously collected, for example, a picture collected by the unscrewed aerial vehicle and a picture shot by the mobile phone of the live streamer).

In this way, the following problems are resolved: For example, due to a structural performance limitation of an electronic device that provides a component capability (for example, the unscrewed aerial vehicle), the electronic device that provides the component capability (for example, the unscrewed aerial vehicle) can be connected to only one electronic device, and cannot be simultaneously connected to a plurality of electronic devices (for example, the mobile phones) and cannot transmit a plurality of pieces of same data obtained by using the component capability. For another example, an electronic device that provides a component capability (for example, the unscrewed aerial vehicle) is far away from another electronic device, and the electronic device that provides the component capability (for example, the unscrewed aerial vehicle) cannot be directly connected to the another electronic device (the mobile phone) through near field communication and cannot provide the component capability for the another electronic device. Therefore, multi-level sharing of a component capability is implemented (for example, the mobile phones share the video data), and user experience is improved.

In another embodiment of this application, the first electronic device may be a minecart, the second electronic device may be a computer that controls movement of the minecart to perform coal mining, and the third electronic device may be a mobile phone that monitors, by using the computer, a movement video of the minecart in a coal mining process.

When the first-level communication relationship is established between the minecart and the computer, the minecart may provide the photographing capability for the computer. To be specific, the computer may control a working status and/or a data transmission status of the minecart.

When the second-level communication relationship is established between the mobile phone and the computer, the computer provides the photographing capability for the mobile phone. To be specific, the mobile phone may control the working status and/or the data transmission status of the minecart by using the computer.

The computer may obtain video data that is on a forward road and that is shot by the minecart, and a user of the computer may control the minecart based on an operation on a virtual camera of the computer, for example, adjusting a movement direction, speed, or the like of the minecart.

A user of the mobile phone may obtain, by using the virtual camera of the computer, the video data shot by the minecart, and monitor the coal mining process of the minecart.

In this way, the following problems are resolved: Due to a structural performance limitation of an electronic device that provides a component capability (for example, the minecart), the electronic device that provides the component capability (for example, the minecart) can be connected to only one electronic device, and the electronic device that provides the component capability (for example, the minecart) cannot be simultaneously connected to a plurality of electronic devices (for example, the computer and the mobile phone) and cannot transmit a plurality of pieces of same data obtained by using the component capability. Alternatively, an electronic device that provides a component capability (for example, the minecart) is far away from another electronic device (the mobile phone), and the electronic device that provides the component capability (for example, the minecart) cannot be directly connected to the another electronic device (the mobile phone) through near field communication and cannot provide the component capability for the another electronic device. Therefore, multi-level sharing of a component capability is implemented (for example, the computer and the mobile phone share the video data), and user experience is improved.

In a possible implementation of the foregoing aspect, the method further includes: When the third electronic device sends a first invoking instruction to the second electronic device, and the second electronic device sends a second invoking instruction to the first electronic device based on the first invoking instruction, the first electronic device provides the preset capability for the second electronic device based on the second invoking instruction; and the second electronic device provides the preset capability for the third electronic device based on the first invoking instruction.

In this embodiment of this application, the first electronic device may be an unscrewed aerial vehicle, the second electronic device may be a mobile phone of an assistant of a live streamer, and the third electronic device may be a mobile phone of the live streamer.

When the mobile phone of the live streamer detects a user operation of invoking distributed capability virtualization by a user, the mobile phone of the live streamer sends an invoking instruction to the mobile phone of the assistant of the live streamer, and the mobile phone of the assistant of the live streamer sends an invoking instruction to the unscrewed aerial vehicle based on the invoking instruction sent by the mobile phone of the live streamer. Then, the unscrewed aerial vehicle may provide a photographing function for the mobile phone of the assistant of the live streamer based on the invoking instruction sent by the mobile phone of the assistant of the live streamer. To be specific, the mobile phone of the assistant of the live streamer may control a working status and/or a data transmission status of the unscrewed aerial vehicle. For example, the unscrewed aerial vehicle sends video data collected through photographing to the mobile phone of the assistant of the live streamer. For another example, the mobile phone of the assistant of the live streamer may send a control instruction to the unscrewed aerial vehicle, to adjust a photographing field of view, a photographing angle, or the like of the unscrewed aerial vehicle.

The mobile phone of the assistant of the live streamer provides the photographing function of the unscrewed aerial vehicle for the mobile phone of the live streamer based on the invoking instruction sent by the mobile phone of the live streamer. To be specific, the mobile phone of the live streamer may control the working status and/or the data transmission status of the unscrewed aerial vehicle by using the mobile phone of the assistant of the live streamer. For example, the mobile phone of the assistant of the live streamer sends, to the mobile phone of the live streamer, the video data received from the unscrewed aerial vehicle. For another example, the mobile phone of the live streamer may send a control instruction to the unscrewed aerial vehicle by using the mobile phone of the assistant of the live streamer, to adjust a photographing field of view, a photographing angle, or the like of the unscrewed aerial vehicle. For another example, the mobile phone of the live streamer may send a control instruction to the mobile phone of the assistant of the live streamer, to control a video data sending status or the like of the mobile phone of the assistant of the live streamer, for example, temporarily stopping sending video data or disabling a video data sending function.

In a possible implementation of the foregoing aspect, the method further includes: that the first electronic device provides the preset capability for the second electronic device based on the second invoking instruction; and the second electronic device provides the preset capability for the third electronic device based on the first invoking instruction includes: The first electronic device sends, to the second electronic device, first data generated during implementation of the preset capability; and the second electronic device sends, to the third electronic device, the first data received from the first electronic device.

In this embodiment of this application, the preset capability may be a photographing capability, an audio collection capability, or the like. If the preset capability is a photographing capability, the first data may be video data or image data; or if the preset capability is an audio collection capability, the first data may be audio data. The following uses a photographing capability as an example for description.

When the mobile phone of the live streamer sends an invoking instruction to the mobile phone of the assistant of the live streamer, and the mobile phone of the assistant of the live streamer sends an invoking instruction to the unscrewed aerial vehicle based on the invoking instruction sent by the mobile phone of the live streamer, the unscrewed aerial vehicle provides the photographing capability for the mobile phone of the assistant of the live streamer based on the invoking instruction sent by the mobile phone of the assistant of the live streamer. For example, the unscrewed aerial vehicle sends video data collected through photographing to the mobile phone of the assistant of the live streamer. The mobile phone of the assistant of the live streamer provides the photographing capability of the unscrewed aerial vehicle for the mobile phone of the live streamer based on the invoking instruction sent by the mobile phone of the live streamer. For example, the mobile phone of the assistant of the live streamer sends, to the mobile phone of the live streamer, the video data collected by the unscrewed aerial vehicle by using the photographing capability.

In a possible implementation of the foregoing aspect, the method further includes: That the first electronic device provides the preset capability for the second electronic device based on the second invoking instruction; and the second electronic device provides the preset capability for the third electronic device based on the first invoking instruction includes:

The third electronic device sends, to the second electronic device, second data generated during implementation of the preset capability; and the second electronic device sends, to the first electronic device, the second data received from the third electronic device.

In this embodiment of this application, the first electronic device may be a sound box, the preset capability may be an audio play capability, and the second data may be audio. The third electronic device sends, to the second electronic device, audio data generated during implementation of audio play; the second electronic device sends, to the sound box, the audio data received from the third electronic device; and the sound box plays a sound based on the audio data.

In a possible implementation of the foregoing aspect, the method further includes: the preset capability includes one or more of a photographing capability, an audio play capability, or an audio collection capability.

In a possible implementation of the foregoing aspect, the method further includes: When the third electronic device obtains an instruction of establishing a third-level communication relationship with the first electronic device, and the third electronic device sends a second-level communication relationship termination instruction to the second electronic device based on the third-level communication relationship establishment instruction, the second electronic device sends device information of the first electronic device to the third electronic device based on the second-level communication relationship termination instruction, and disables the second-level communication relationship; and the third electronic device establishes the third-level communication relationship with the first electronic device based on the device information of the first electronic device, where the third-level communication relationship is used to indicate the first electronic device to provide the preset capability for the third electronic device.

According to a second aspect, an embodiment of this application provides a distributed device capability virtualization method, and the method includes: A second electronic device receives a second-level communication relationship establishment request sent by a third electronic device.

When the second electronic device grants, based on the second-level communication relationship request, establishment of a second-level communication relationship with the second electronic device to the third electronic device, the third electronic device establishes the second-level communication relationship with the second electronic device, where the second-level communication relationship is used to indicate the third electronic device to use a preset capability of a first electronic device by using the second electronic device.

In a possible implementation of the foregoing aspect, the method further includes: When the second electronic device receives a first invoking instruction sent by the third electronic device, and the second electronic device sends a second invoking instruction to the first electronic device based on the first invoking instruction, the second electronic device provides the preset capability for the third electronic device based on the first invoking instruction.

In a possible implementation of the foregoing aspect, the second electronic device sends, to the third electronic device, first data received from the first electronic device.

In a possible implementation of the foregoing aspect, that the second electronic device provides the preset capability for the third electronic device based on the first invoking instruction includes:

The second electronic device sends, to the first electronic device, second data received from the third electronic device.

In a possible implementation of the foregoing aspect, the preset capability includes one or more of a photographing capability, an audio play capability, or an audio collection capability.

In a possible implementation of the foregoing aspect, the method further includes: When the third electronic device obtains an instruction of establishing a third-level communication relationship with the first electronic device, and the third electronic device sends a second-level communication relationship termination instruction to the second electronic device based on the third-level communication relationship establishment instruction, the second electronic device sends device information of the first electronic device to the third electronic device based on the second-level communication relationship termination instruction, and disables the second-level communication relationship.

According to a third aspect, an embodiment of this application further provides a readable medium. The readable medium stores instructions, and when the instructions are executed by an electronic device, the distributed device capability virtualization method in any implementation of the first aspect and the second aspect is implemented.

According to a fourth aspect, an embodiment of this application further provides an electronic device, including:

a memory, configured to store instructions; and a processor, where the processor is configured to execute the instructions to implement the distributed device capability virtualization method in any implementation of the second aspect.

BRIEF DESCRIPTION OF DRAWINGS

FIG. 4A to FIG. 4D are a schematic flowchart for establishing a concatenation relationship between an unscrewed aerial vehicle 100, a mobile phone 200, and a mobile phone 300 according to some embodiments of this application;

DESCRIPTION OF EMBODIMENTS

Illustrative embodiments of this application include but are not limited to a distributed device capability virtualization method, a medium, and an electronic device. The following further describes in detail the technical solutions in embodiments of this application with reference to the accompanying drawings and embodiments.

For ease of understanding, some terms used in embodiments of this application are first described.

An original device is a device configured to provide an actual physical component capability. For example, an actual physical component may be a camera, a microphone, a speaker, or the like of the original device. An actual physical component capability corresponding to the actual physical component may be a photographing capability, a sound pickup capability (an audio collection capability), a sound play capability (an audio play capability, an electro-acoustic conversion capability, and a loud speaking capability), and the like. However, this is not limited thereto.

A level-1 device is configured to create a virtual device node in the level-1 device by using a physical component capability of the original device. For example, the level-1 device creates a virtual camera node in the level-1 device by using the camera of the original device, so that the level-1 device can receive video data collected by the camera of the original device.

A level-2 device is configured to create a level-2 virtual device node in the level-2 device by using a virtual device capability of the level-1 device. For example, the level-2 device creates a level-2 virtual camera node in the level-2 device by using a photographing capability of a virtual camera of the level-1 device, so that the level-2 device can receive video data collected by the level-1 device from the camera of the original device.

In addition to that the original device, the level-1 device, and the level-2 device are cascaded (that is, a multi-level virtualization capability is implemented through cascading), and sequentially transmit data, at least three devices may be cascaded and sequentially transmit data. In this way, a function of sequentially transmitting, between a plurality of levels of devices, data collected by a source device is implemented.

A data transmission solution provided in the embodiments of this application is described below by using an example in which three devices are cascaded and a virtual device capability is a photographing capability.

Figure 1A:
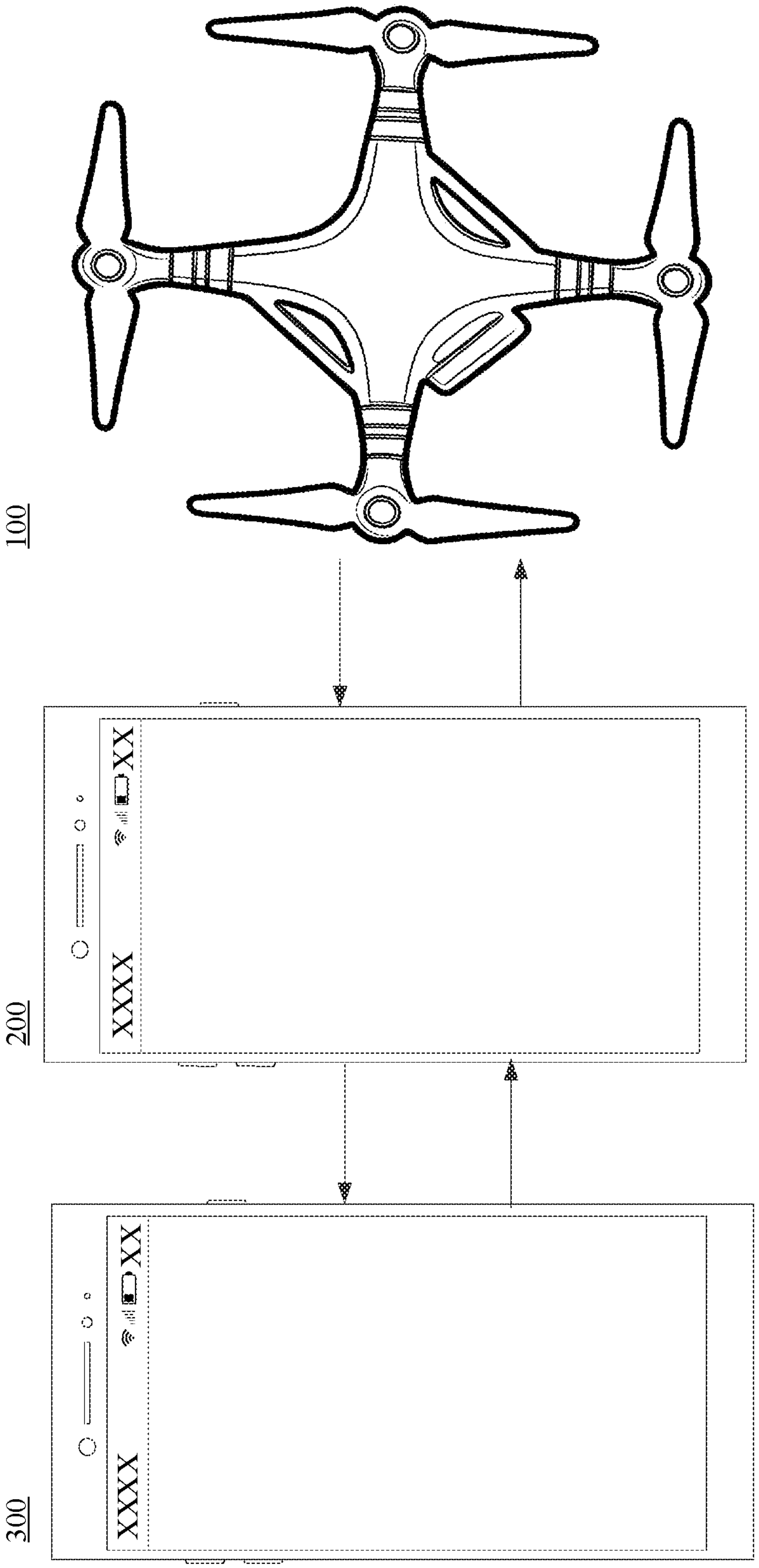
FIG. 1A is a diagram of an application scenario in which three electronic devices are cascaded to share video data according to some embodiments of this application.

FIG. 1A is a diagram of an application scenario in which three electronic devices are cascaded to share video data according to some embodiments of this application.

As shown in FIG. 1A, the application scenario includes an electronic device 100, an electronic device 200, and an electronic device 300. The electronic device 100 serves as the mentioned original device that provides an actual photographing capability, the electronic device 200 serves as the level-1 device that uses the photographing capability of the original device, and the electronic device 300 serves as the mentioned level-2 device that uses a virtual photographing capability of the level-1 device.

For ease of description, the following is described by using an example of a dual-view live stream scenario in which the electronic device 100 is an unscrewed aerial vehicle 100, the electronic device 200 is a mobile phone 200 of an assistant of a live streamer, and the electronic device 300 is a mobile phone 300 of the live streamer.

In an application scenario in which the unscrewed aerial vehicle 100 with better photographing performance (for example, a photographing field of view is wide) is used, the unscrewed aerial vehicle 100 can shoot video data with a wide field of view. The unscrewed aerial vehicle 100 may provide, for the mobile phone 200 of the assistant of the live streamer, a capability of shooting video data with a wide field of view; and the mobile phone 200 of the assistant of the live streamer may provide, for the mobile phone 300 of the live streamer, the capability of the unscrewed aerial vehicle 100 of shooting video data with a wide field of view.

Specifically, in an application scenario in which the unscrewed aerial vehicle 100 with better photographing performance (for example, a photographing field of view is wide) is used to implement dual-view live stream (a picture collected by the unscrewed aerial vehicle 100 and a picture shot by the mobile phone 300 of the live streamer), for example, as shown in FIG. 1A, in the application scenario, the unscrewed aerial vehicle 100 can shoot video data with a wide field of view; the mobile phone 200 of the assistant of the live streamer creates a camera of the unscrewed aerial vehicle 100 as a level-1 virtual camera by using a virtualization procedure; and the mobile phone 300 of the live streamer creates the virtual camera on the mobile phone 200 of the assistant of the live streamer as a level-2 virtual camera of the mobile phone 300 of the live streamer by using a level-2 virtualization process.

In this way, the mobile phone 200 of the assistant of the live streamer may obtain video data corresponding to a picture collected by the unscrewed aerial vehicle 100. When the assistant of the live streamer watches the video, the assistant of the live streamer may control the unscrewed aerial vehicle 100 based on an operation on the virtual camera of the mobile phone 200, for example, adjusting a photographing field of view, a photographing angle, or the like of the unscrewed aerial vehicle 100, to select a better picture for the live streamer.

The live streamer may obtain, by using the virtual camera of the mobile phone 200, the video data shot by the unscrewed aerial vehicle 100, and shoot the live streamer by using a front-facing camera of the mobile phone 300. In addition, the mobile phone 300 combines the video data obtained from the mobile phone 200 by using the virtual camera and image data collected by a physical camera of the mobile phone 300, to implement dual-view live stream (two pictures are simultaneously collected, for example, a picture collected by the unscrewed aerial vehicle 100 and a picture shot by the mobile phone 300 of the live streamer).

As described above, in the scenario shown in FIG. 1A, to resolve the problem in the background, in this embodiment of this application, a data transmission path relationship used to send the video data shot by the unscrewed aerial vehicle 100 to the mobile phone 200 is set in the unscrewed aerial vehicle 100; a data transmission path relationship used by the mobile phone 200 to receive the video data sent by the unscrewed aerial vehicle 100 that provides the photographing capability and a data transmission path used by the mobile phone 200 to send, to the mobile phone 300, the video data received from the unscrewed aerial vehicle 100 are set in the mobile phone 200; and a data transmission path relationship used by the mobile phone 300 to receive, from the mobile phone 200, the video data sent by the unscrewed aerial vehicle 100 is set in the mobile phone 300. In this way, the following problems are resolved: For example, due to a structural performance limitation of an electronic device that provides a component capability (for example, the unscrewed aerial vehicle 100), the electronic device that provides the component capability (for example, the unscrewed aerial vehicle 100) can be connected to only one electronic device, and cannot be simultaneously connected to a plurality of electronic devices (for example, the mobile phone 200 and the mobile phone 300) and cannot transmit a plurality of pieces of same data obtained by using the component capability. For another example, an electronic device that provides a component capability (for example, the unscrewed aerial vehicle 100) is far away from another electronic device, and the electronic device that provides the component capability (for example, the unscrewed aerial vehicle 100) cannot be directly connected to the another electronic device (the mobile phone 300) through near field communication and cannot provide the component capability for the another electronic device. Therefore, multi-level sharing of a component capability is implemented (for example, the mobile phone 200 and the mobile phone 300 share the video data), and user experience is improved.

Figure 1B:
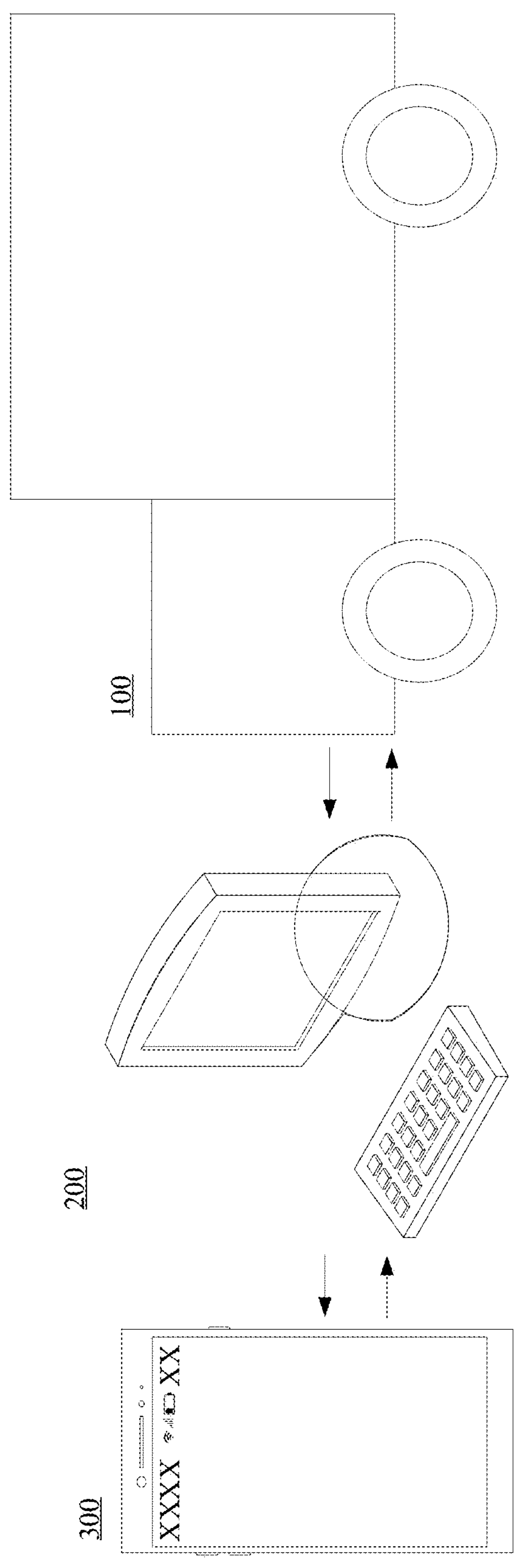
FIG. 1B is a diagram of another application scenario in which three electronic devices are cascaded to share video data according to some embodiments of this application.

FIG. 1B is a diagram of another application scenario in which three electronic devices are cascaded to share video data according to some embodiments of this application.

As shown in FIG. 1B, the application scenario includes an electronic device 100, an electronic device 200, and an electronic device 300. The electronic device 100 serves as the mentioned original device that provides an actual photographing capability, the electronic device 200 serves as the level-1 device that uses the photographing capability of the original device, and the electronic device 300 serves as the mentioned level-2 device that uses a virtual photographing capability of the level-1 device.

For ease of description, the following is further described by using an example of an application scenario in which a minecart is controlled to perform coal mining, where the electronic device 100 is a minecart 100 for coal mining, the electronic device 200 is a computer 200 that controls movement of the minecart 100 to perform coal mining, and the electronic device 300 is a mobile phone 300 that monitors, by using the computer 200, a movement video of the minecart 100 in a coal mining process.

In the scenario, the minecart 100 with a photographing capability can provide, for the computer 200, a capability of shooting video data on a forward road; and the computer 200 can provide, for the mobile phone 300, the capability of the minecart 100 of shooting video data on a forward road.

Specifically, as shown in FIG. 1B, in the application scenario, in one aspect, if the minecart 100 simultaneously sends two pieces of same video data to the computer 200 and the mobile phone 300, a large bandwidth needs to be occupied. Because the minecart 100 is underground, due to a poor network in an underground environment, the minecart 100 cannot simultaneously or stably transmit collected data to the computer 200 and the mobile phone 300. Therefore, the minecart 100 is not suitable for simultaneously connecting to the computer 200 and the mobile phone 300 and sending video data to the computer 200 and the mobile phone 300. In another aspect, the minecart 100 has poor performance, and therefore does not have a capability of sending two pieces of same video data to the computer 200 and the mobile phone 300.

Therefore, the computer 200 creates a camera of the minecart 100 as a level-1 virtual camera by using a virtualization procedure, and the mobile phone 300 creates the virtual camera on the computer 200 as a level-2 virtual camera of the mobile phone 300 by using a level-2 virtualization process.

In this way, the computer 200 may obtain video data that is on a forward road and that is shot by the minecart 100, and a user of the computer 200 may control the minecart 100 based on an operation on the virtual camera of the computer 200, for example, adjusting a movement direction, speed, or the like of the minecart 100.

A user of the mobile phone 300 may obtain, by using the virtual camera of the computer 200, the video data shot by the minecart 100, and monitor the coal mining process of the minecart 100.

As described above, in the scenario shown in FIG. 1B, to resolve the problem in the background, in this embodiment of this application, a data transmission path relationship used to send the video data shot by the minecart 100 to the computer 200 is set in the minecart 100; a data transmission path relationship used by the computer 200 to receive the video data sent by the minecart 100 that provides the photographing capability and a data transmission path used by the computer 200 to send, to the mobile phone 300, the video data received from the minecart 100 are set in the computer 200; and a data transmission path relationship used by the mobile phone 300 to receive, from the computer 200, the video data sent by the minecart 100 is set in the mobile phone 300.

In this way, the following problems are resolved: Due to a structural performance limitation of an electronic device that provides a component capability (for example, the minecart 100), the electronic device that provides the component capability (for example, the minecart 100) can be connected to only one electronic device, and the electronic device that provides the component capability (for example, the minecart 100) cannot be simultaneously connected to a plurality of electronic devices (for example, the computer 200 and the mobile phone 300) and cannot transmit a plurality of pieces of same data obtained by using the component capability. Alternatively, an electronic device that provides a component capability (for example, the minecart 100) is far away from another electronic device (the mobile phone 300), and the electronic device that provides the component capability (for example, the minecart 100) cannot be directly connected to the another electronic device (the mobile phone 300) through near field communication and cannot provide the component capability for the another electronic device. Therefore, multi-level sharing of a component capability is implemented (for example, the computer 200 and the mobile phone 300 share the video data), and user experience is improved.

It can be understood that the electronic device 100 applicable to the embodiments of this application may be an electronic device, for example, a camera, a minecart, a 5G minecart, a microphone, an unscrewed aerial vehicle, a mobile phone, a computer, a laptop computer, or a tablet computer, that can provide various capabilities (such as a photographing capability, a sound pickup capability, and a sound play capability) for another device.

In addition, it can be understood that the electronic device 200 and the electronic device 300 that are applicable to the embodiments of this application each may be an electronic device, for example, a mobile phone, a computer, a laptop computer, a tablet computer, a television, or an in-vehicle terminal, that can invoke another electronic device to implement various capabilities.

Figure 2:
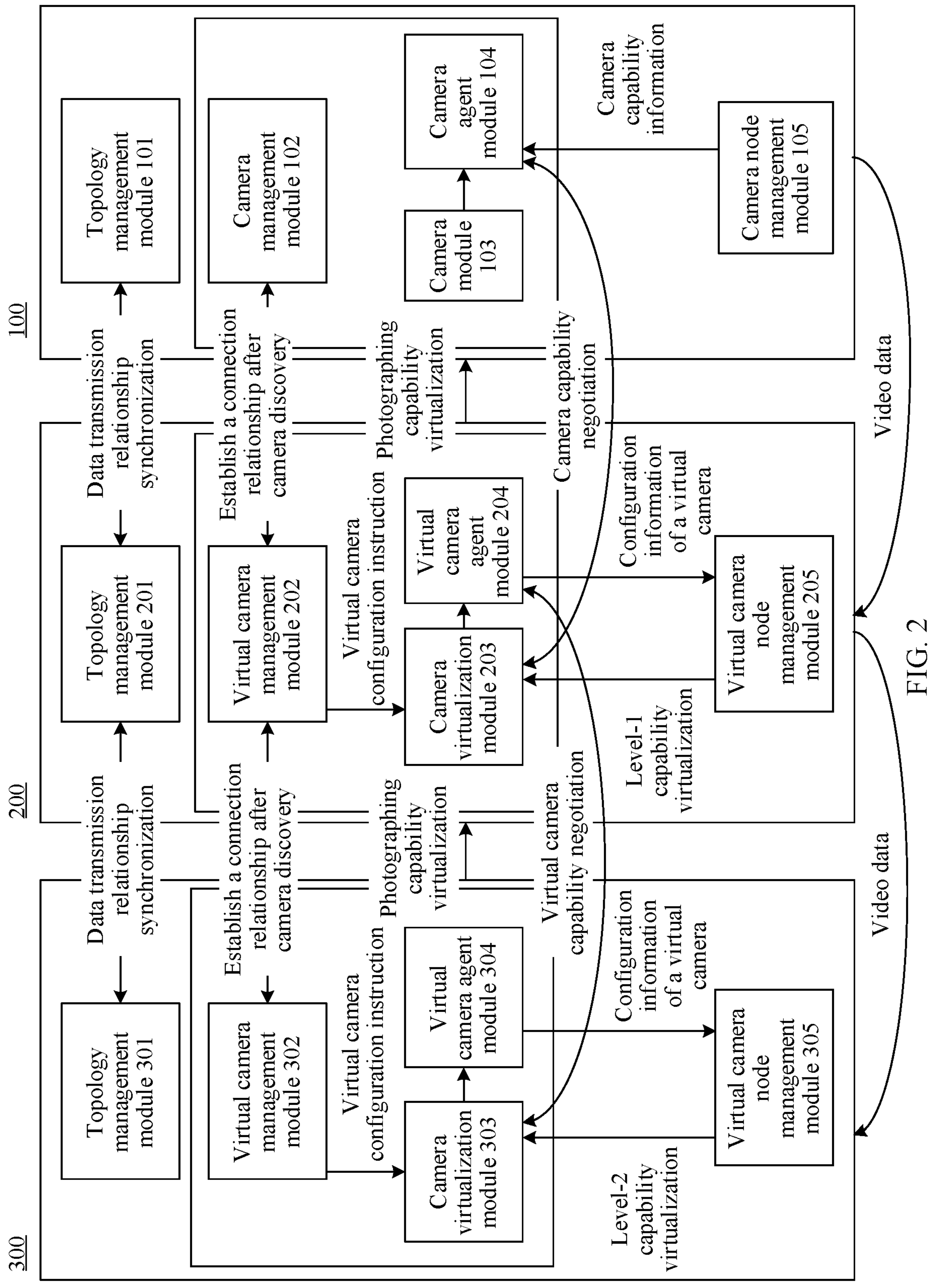
FIG. 2 is a diagram of a system architecture for implementing multi-level wireless transmission of video data between a mobile phone 300, a mobile phone 200, and an unscrewed aerial vehicle 100 according to some embodiments of this application.

A level-2 virtualization scenario in which the foregoing three electronic devices participate is used as an example. FIG. 2 is a diagram of a system architecture for implementing multi-level wireless transmission of video data between the mobile phone 300, the mobile phone 200, and the unscrewed aerial vehicle 100 in the foregoing scenario according to some embodiments of this application. The system is configured to implement the data transmission method in this application. The following mainly describes a topology management module 101 and a camera module 103 that are disposed in the unscrewed aerial vehicle 100, a topology management module 201 and a camera virtualization module 203 that are disposed in the mobile phone 200, and a topology management module 301 and a camera virtualization module 303 that are disposed in the mobile phone 300. Other functional modules in the system are described when a schematic flowchart is described below.

As described above, the camera module 103 may be disposed in the unscrewed aerial vehicle 100, to provide a function of collecting video data shot by a camera of the unscrewed aerial vehicle 100 and sending the video data to the mobile phone 200. The topology management module 101 may be disposed in the unscrewed aerial vehicle 100, to provide a function of managing a data transmission relationship, for example, a path relationship used by the unscrewed aerial vehicle 100 to send the video data to the mobile phone 200.

The camera virtualization module 203 may be disposed in the mobile phone 200, to provide a function of receiving the video data shot by the camera of the unscrewed aerial vehicle 100 and sending the video data to the mobile phone 300. The topology management module 201 may be disposed in the mobile phone 200, to provide a function of managing a data transmission relationship, for example, a path relationship used by the mobile phone 200 to receive the video data sent by the unscrewed aerial vehicle 100 and transmit the received video data to the mobile phone 300.

The camera virtualization module 303 may be disposed in the mobile phone 300, to provide a function of receiving the video data that is sent by the mobile phone 200 and that is shot by the camera of the unscrewed aerial vehicle 100. The topology management module 301 may be disposed in the mobile phone 300, to provide a function of managing a data transmission relationship, for example, a data path relationship used by the mobile phone 300 to receive the video data that is sent by the mobile phone 200 and that is shot by the unscrewed aerial vehicle 100.

In this way, a limitation problem in the conventional technology that virtualization can be completed between only two devices is resolved, and a plurality of levels of electronic devices share video data, thereby improving user experience.

The following describes an example diagram of a software architecture of a mobile phone 300 used by a user (for example, a live streamer) of the mobile phone 300 to obtain, by using a virtual camera of a mobile phone 200, video data shot by an unscrewed aerial vehicle 100 (for example, an unscrewed aerial vehicle), and shoot the user by using a front-facing camera of the mobile phone 300.

Figure 3:
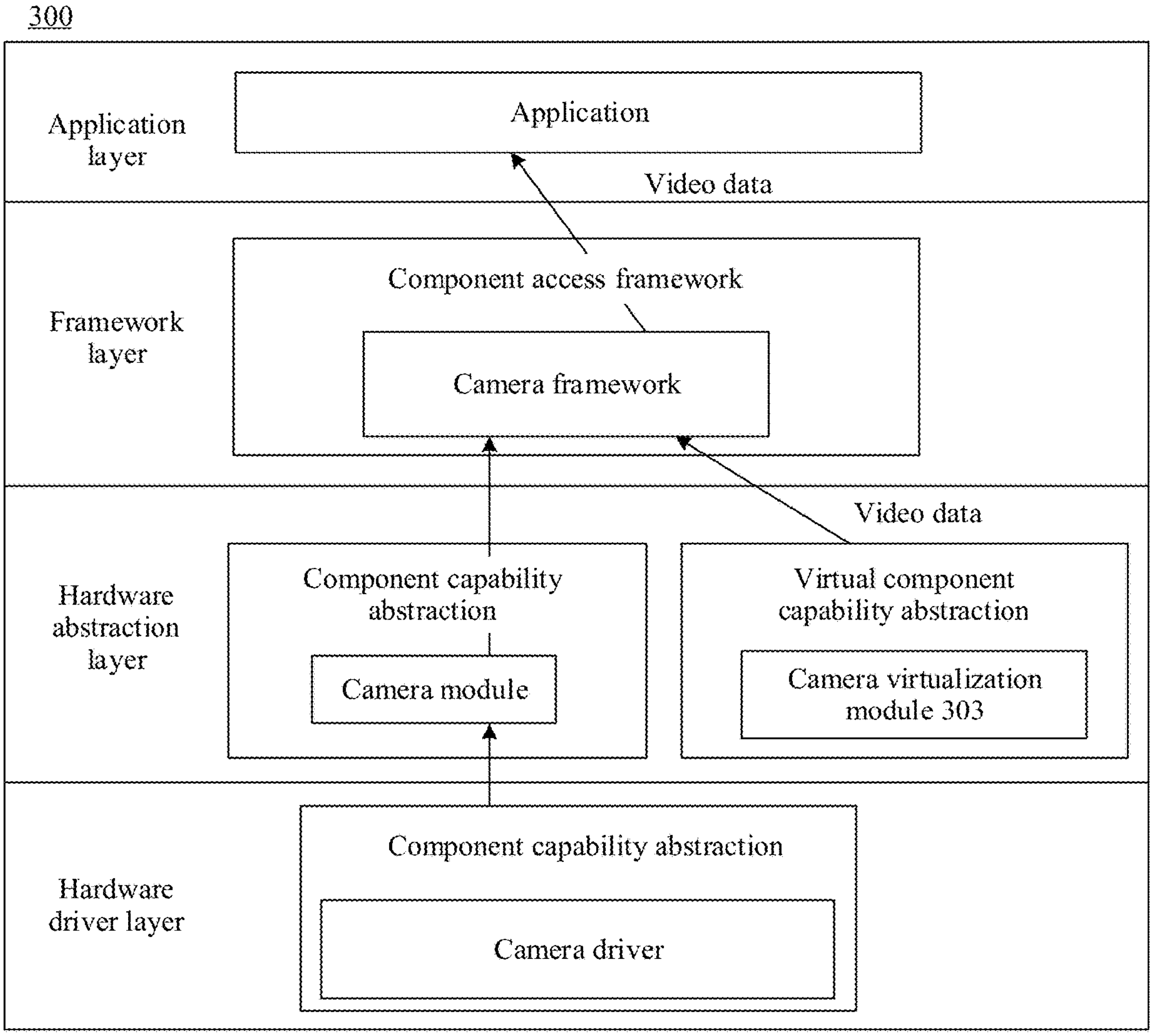
FIG. 3 is a diagram of a software architecture of a mobile phone 300 used by a user (for example, a live streamer) of the mobile phone 300 to obtain, by using a virtual camera of a mobile phone 200, video data shot by an unscrewed aerial vehicle 100, and shoot the user by using a front-facing camera of the mobile phone 300 according to some embodiments of this application.
Figure 4A:
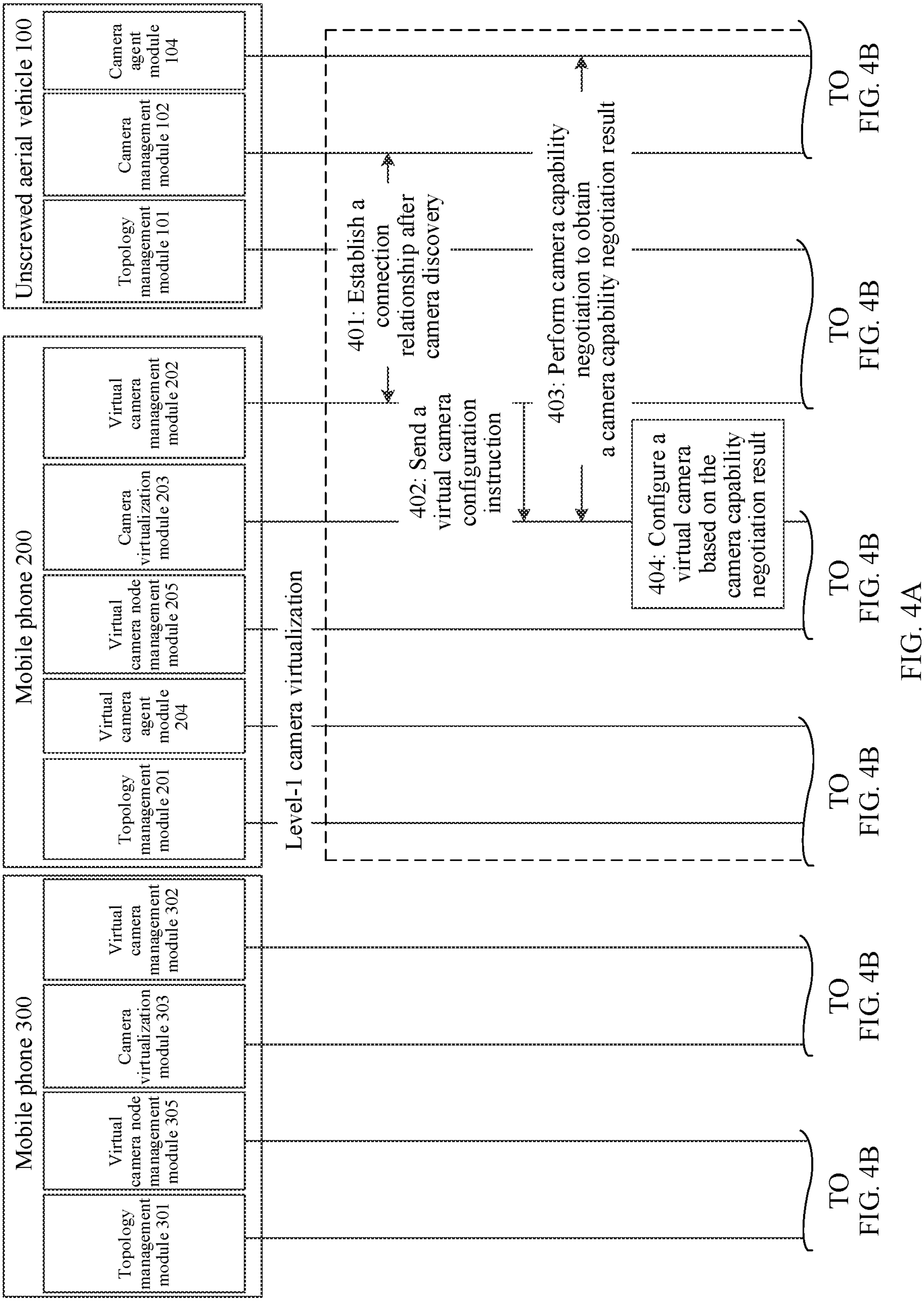
Figure 4C:
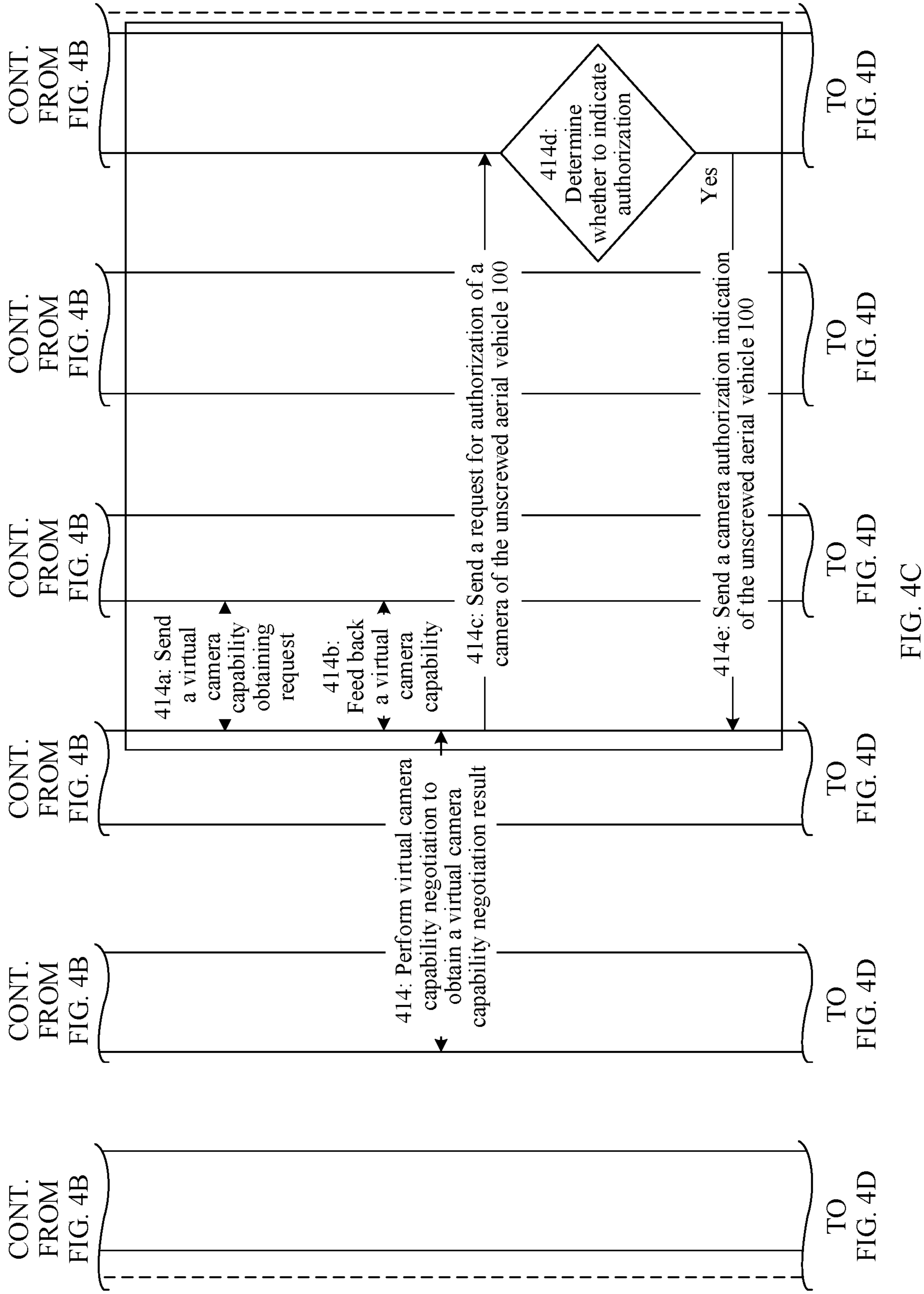
Figure 4D:
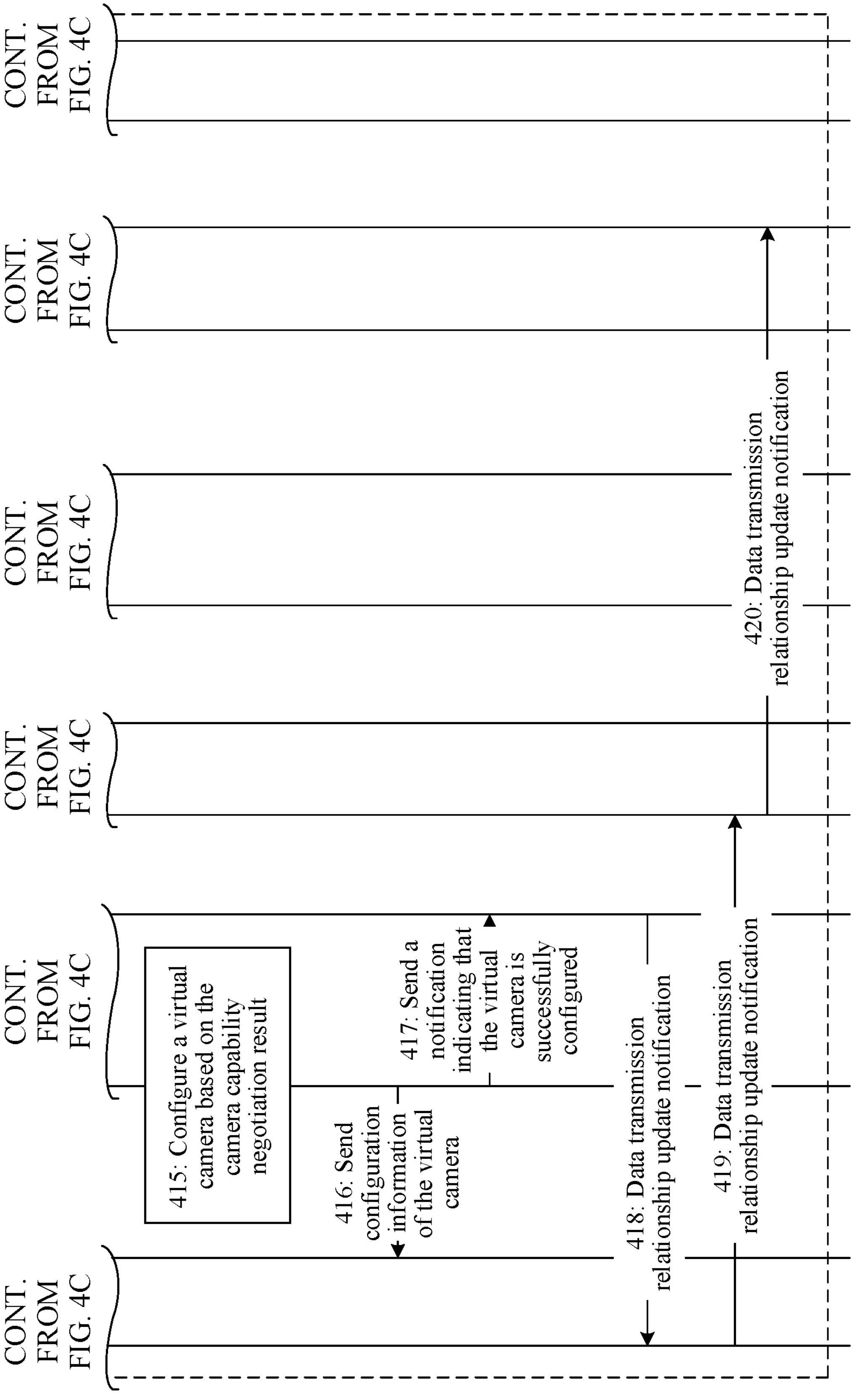

FIG. 3 is a diagram of a software architecture of a mobile phone 300 used by a user (for example, a live streamer) of the mobile phone 300 to obtain, by using a virtual camera of a mobile phone 200, video data shot by an unscrewed aerial vehicle 100 (for example, an unscrewed aerial vehicle), and shoot the user by using a front-facing camera of the mobile phone 300 according to some embodiments of this application. As shown in FIG. 3, the diagram of software architecture includes a camera driver in a hardware driver layer, a camera module and a camera virtualization module in a hardware abstraction layer, a camera framework in a framework layer, and an application (program) in an application layer.

The hardware driver layer of the mobile phone 300 includes the camera driver. The camera driver is configured to connect to a camera component of the mobile phone 300, and drive the camera component of the mobile phone 300 to shoot an image or a video. For example, a user (for example, a live streamer) of the mobile phone 300 shoots the user by using the front-facing camera of the mobile phone 300.

The camera driver in the hardware driver layer transfers, by sequentially using the camera module in the hardware abstraction layer and the camera framework in the framework layer, the image or the video shot by the camera component of the mobile phone 300 to the application (program) in the application layer for display.

The camera virtualization module 303 in the hardware abstraction layer transfers, by using the camera framework in the framework layer, a video received from the mobile phone 200 to the application (program) in the application layer for display.

The following describes the technical solutions in this application based on FIG. 2 in two phases: establishing a concatenation relationship between the unscrewed aerial vehicle 100, the mobile phone 200, and the mobile phone 300, and terminating a concatenation relationship between the unscrewed aerial vehicle 100, the mobile phone 200, and the mobile phone 300.

Phase of Establishing a Concatenation Relationship Between the Unscrewed Aerial Vehicle 100, the Mobile Phone 200, and the Mobile Phone 300:

FIG. 4A to FIG. 4D are a schematic flowchart for establishing a concatenation relationship between an unscrewed aerial vehicle 100, a mobile phone 200, and a mobile phone 300 according to an embodiment of this application. As shown in FIG. 4A to FIG. 4D, the procedure includes the following steps.

First, a level-1 device virtual concatenation relationship is established between the unscrewed aerial vehicle 100 and the mobile phone 200. For details, refer to the following steps.

401: A virtual camera management module 202 of the mobile phone 200 and a camera management module 102 of the unscrewed aerial vehicle 100 establish a connection relationship after device discovery.

It can be understood that to transmit an instruction, a camera capability negotiation result, video data, and the like between the mobile phone 200 and the unscrewed aerial vehicle 100, a wired or wireless connection relationship needs to be established between the mobile phone 200 and the unscrewed aerial vehicle 100.

In some embodiments, a wired connection relationship may be established between the mobile phone 200 and the unscrewed aerial vehicle 100 by using a USB cable or the like.

In some other embodiments, a wireless communication connection relationship may be established between the mobile phone 200 and the unscrewed aerial vehicle 100.

For example, the mobile phone 200 and the unscrewed aerial vehicle 100 log in to a same network. For example, the mobile phone 200 may establish a Wi-Fi connection to the unscrewed aerial vehicle 100 by using a router, or the mobile phone 200 may directly establish a Wi-Fi P2P connection to the unscrewed aerial vehicle 100, or a Bluetooth connection is established between the mobile phone 200 and the unscrewed aerial vehicle 100.

Alternatively, the mobile phone 200 may directly establish a short-range wireless connection to the unscrewed aerial vehicle 100. The short-range wireless connection includes but is not limited to a near field communication (NFC) connection, an infrared connection, an ultra wideband (UWB) connection, and a ZigBee protocol connection. Alternatively, the mobile phone 200 may directly establish a mobile network connection to the unscrewed aerial vehicle 100. The mobile network includes but is not limited to a mobile network that supports 2G, 3G, 4G, 5G, and a subsequent standard protocol. For example, the virtual camera management module 202 of the mobile phone 200 sends a wireless connection request to a surrounding device through network broadcast. When the unscrewed aerial vehicle 100 receives the wireless connection request, the camera management module 102 of the unscrewed aerial vehicle 100 sends response feedback to the mobile phone 200, so that a wireless communication relationship is established between the mobile phone 200 and the unscrewed aerial vehicle 100.

Alternatively, an application used to manage a smart home device (for example, an unscrewed aerial vehicle, a television, a tablet computer, an air conditioner, a sound box, or a refrigerator) in a home may be installed in the mobile phone 200. Using a smart home application as an example, a user may add one or more smart home devices to the smart home application, so that an association is established between the smart home device added by the user and the mobile phone 200. For example, a two-dimensional code including device information such as a device identifier may be set on a smart home device. After scanning the two-dimensional code by using the smart home application of the mobile phone 200, the user may add the corresponding smart home device to the smart home application, to establish an association relationship between the smart home device and the mobile phone 200. In this embodiment of this application, when the one or more smart home devices added to the smart home application go online, for example, when the mobile phone 200 detects a Wi-Fi signal sent by an added smart home device, the mobile phone 200 may display the smart home device as a candidate device, and prompt the user to choose to use a corresponding smart home device to perform synchronous photographing with the mobile phone 200.

Alternatively, if the mobile phone 200 automatically finds the unscrewed aerial vehicle 100 with a photographing capability and establishes a wireless communication connection relationship with the unscrewed aerial vehicle 100, the mobile phone 300 directly enters a phase of obtaining video data of the unscrewed aerial vehicle 100. In this case, the user does not need to manually select a specific device that establishes a wireless communication connection relationship with the mobile phone 200.

Alternatively, the mobile phone 200 may have established a network connection to one or more electronic devices with a photographing function. For example, before the user starts an application program supporting a video call in the mobile phone 200, the mobile phone 200 has established a wireless communication connection relationship with the unscrewed aerial vehicle 100. Subsequently, the mobile phone 200 may no longer search for an electronic device with a photographing function.

402: The virtual camera management module 202 of the mobile phone 200 sends a virtual camera configuration instruction to the camera virtualization module 203 of the mobile phone 200.

It can be understood that the virtual camera configuration instruction is used to instruct the mobile phone 200 to invoke the camera virtualization module 203, that is, configure the camera virtualization module 203 based on a result of camera capability negotiation between the mobile phone 200 and the unscrewed aerial vehicle 100. The following further describes a camera capability negotiation result.

403: The camera virtualization module 203 of the mobile phone 200 and a camera agent module 104 of the unscrewed aerial vehicle 100 perform camera capability negotiation to obtain a camera capability negotiation result.

It can be understood that the camera capability negotiation result may include a camera configuration parameter, and the mobile phone 200 and the unscrewed aerial vehicle 100 may obtain a camera configuration parameter with better performance through negotiation.

Because the mobile phone 200 and the unscrewed aerial vehicle 100 process video data in different manners, the mobile phone 200 and the unscrewed aerial vehicle 100 need to negotiate for a video data processing manner, so that the mobile phone 200 can effectively receive video data transmitted by the unscrewed aerial vehicle 100. For example, camera capability negotiation may be negotiation of a video data encoding/decoding capability between the unscrewed aerial vehicle 100 and the mobile phone 200. For example, when both the unscrewed aerial vehicle 100 and the mobile phone 200 support an H.264 encoding/decoding capability and an H.265 encoding/decoding capability, the camera capability negotiation result is that the unscrewed aerial vehicle 100 and the mobile phone 200 use the H.265 encoding/decoding capability with better performance in a video data transmission process.

For another example, whether the unscrewed aerial vehicle 100 performs processing such as color space conversion, scaling, rotation, mirroring, filling, image contrast, or image resolution on video data is negotiated. Whether the mobile phone 200 performs processing such as color space conversion, scaling, rotation, mirroring, filling, image contrast, or image resolution on video data is negotiated. A camera capability negotiation result may be that the unscrewed aerial vehicle 100 performs color space conversion on video data, and then the mobile phone 200 performs processing such as color space conversion, scaling, rotation, mirroring, and the like on received video data. However, this is not limited thereto.

In addition, it can be understood that to obtain video data with a better play effect (for example, picture quality), the mobile phone 200 may send, to the unscrewed aerial vehicle 100, user requirement information or parameter information that is stored in the mobile phone 200 and that is used to configure a camera of the unscrewed aerial vehicle 100.

For example, camera capability negotiation may alternatively be setting negotiation of camera parameters in the unscrewed aerial vehicle 100, such as camera resolution, a frame rate, photosensibility (ISO value), a continuous photographing speed, a focusing speed, exposure time, a bit depth of an image, a cell size, an exposure mode, and a focusing mode.

404: The camera virtualization module 203 of the mobile phone 200 configures the camera virtualization module 203 based on the camera capability negotiation result.

The camera virtualization module 203 of the mobile phone 200 may configure the camera virtualization module 203 based on a camera capability negotiation result for the video data processing manner. For example, the mobile phone 200 configures the camera virtualization module 203 to decode, in a video data transmission process by using the H.265 encoding/decoding capability with better performance, video data received from the unscrewed aerial vehicle 100.

405: The camera virtualization module 203 of the mobile phone 200 sends configuration information of a virtual camera to a virtual camera node management module 205 of the mobile phone 200.

It can be understood that the configuration information of the virtual camera may be configuration time of the camera virtualization module 203 and the camera capability negotiation result used to configure the camera virtualization module 203. In this way, when a data transmission relationship is subsequently established between the mobile phone 300 and the mobile phone 200, the mobile phone 300 may directly obtain, from the virtual camera node management module 205, the result of camera capability negotiation between the mobile phone 200 and the unscrewed aerial vehicle 100, to configure the camera virtualization module 303 of the mobile phone 300, thereby reducing time for establishing the data transmission relationship between the mobile phone 300 and the mobile phone 200, and improving efficiency of establishing the data transmission relationship between the mobile phone 300 and the mobile phone 200.

406: The virtual camera node management module 205 of the mobile phone 200 sends, to the virtual camera management module 202 of the mobile phone 200, a notification indicating that the virtual camera is successfully configured.

407: After receiving the notification that is sent by the virtual camera node management module 205 of the mobile phone 200 and that indicates that the virtual camera is successfully configured, the virtual camera management module 202 of the mobile phone 200 sends a data transmission relationship update notification to the topology management module 201 of the mobile phone 200.

The topology management module 101 is configured to manage a data transmission relationship between a plurality of levels of devices. Specifically, the managing a data transmission relationship between a plurality of levels of devices may include updating the data transmission relationship between the devices, adding a device node to the data transmission relationship, removing a device node from the data transmission relationship, and the like.

In this embodiment of this application, before the virtual camera management module 202 of the mobile phone 200 receives the notification that is sent by the virtual camera node management module 205 of the mobile phone 200 and that indicates that the virtual camera is successfully configured, a data transmission relationship is that the unscrewed aerial vehicle 100 has no object to which video data is transmitted.

After the virtual camera management module 202 of the mobile phone 200 receives the notification that is sent by the virtual camera node management module 205 of the mobile phone 200 and that indicates that the virtual camera is successfully configured, a data transmission relationship is that the unscrewed aerial vehicle 100 transmits video data shot by a camera to the mobile phone 200.

Therefore, it can be understood that the data transmission relationship update notification includes anew data transmission relationship that the unscrewed aerial vehicle 100 transmits video data shot by the camera to the mobile phone 200.

408: After receiving the data transmission relationship update notification sent by the virtual camera management module 202 of the mobile phone 200, the topology management module 201 of the mobile phone 200 sends a data transmission relationship update notification to the topology management module 101 of the unscrewed aerial vehicle 100.

The data transmission relationship update notification includes a new data transmission relationship that the unscrewed aerial vehicle 100 transmits the video data shot by the camera to the mobile phone 200.

The data transmission relationship may be recorded in the following format:

```
{
SourceDevice: unscrewed aerial vehicle 100
Capability: camera
Virtualization Path: unscrewed aerial vehicle 100 and mobile phone 200
}
```

"SourceDevice" represents a source device that provides a component capability, and content after "SourceDevice:" indicates that the source device that provides the component capability is the unscrewed aerial vehicle 100. "Capability" represents the component capability provided by the source device, and content after "Capability:" indicates that the component capability provided by the source device is a photographing capability. "Virtualization Path" represents the data transmission relationship, and content after "Virtualization Path:" indicates that the unscrewed aerial vehicle 100 transmits video data shot by a camera to the mobile phone 200.

After the level-1 device virtual concatenation relationship is established between the unscrewed aerial vehicle 100 and the mobile phone 200, a level-2 device virtual concatenation relationship is established between the mobile phone 200 and the mobile phone 300. For details, refer to the following steps.

409: A virtual camera management module 302 of the mobile phone 300 and the virtual camera management module 202 of the mobile phone 200 establish a connection relationship after device discovery.

Step 409 and step 401 above are based on a same inventive concept, and details are not described herein again.

410: The virtual camera management module 202 of the mobile phone 200 sends connection succeed information to the camera virtualization module 203 of the mobile phone 200.

411: After receiving the connection succeed information sent by the virtual camera management module 202 of the mobile phone 200, the camera virtualization module 203 of the mobile phone 200 sends a virtual capability query request to the virtual camera management module 202 of the mobile phone 200.

The mobile phone 200 may simultaneously use a photographing capability, a sound pickup capability, and a sound play capability of an external device. To determine that the mobile phone 200 uses the photographing capability of the external device, after receiving the connection succeed information sent by the virtual camera management module 202 of the mobile phone 200, the camera virtualization module 203 of the mobile phone 200 sends the virtual capability query request to the virtual camera management module 202 of the mobile phone 200, where the virtual capability query request is used to query a capability that is of the external device and that is used by the mobile phone 200.

412: The virtual camera management module 202 of the mobile phone 200 sends a virtual capability as a virtual photographing capability to the virtual camera management module 302 of the mobile phone 300.

413: When the virtual camera management module 302 of the mobile phone 300 learns that the virtual capability of the mobile phone 200 is the virtual photographing capability, the virtual camera management module 302 of the mobile phone 300 sends a virtual camera configuration instruction to the camera virtualization module 303 of the mobile phone 300.

414: The camera virtualization module 303 of the mobile phone 300 and a virtual camera agent module 204 of the mobile phone 200 perform camera capability negotiation to obtain a camera capability negotiation result.

A specific negotiation process is as follows.

**414*a*: The virtual camera agent module 204 of the mobile phone 200 sends a virtual camera capability query request to the virtual camera node management module 205 of the mobile phone 200**.

Because the mobile phone 200 and the unscrewed aerial vehicle 100 have performed camera capability negotiation once in step 403, the virtual camera capability query request is intended to obtain the camera capability negotiation result in step 403.

**414*b*: The virtual camera agent module 204 of the mobile phone 200 receives found virtual camera capability information sent by the virtual camera node management module 205 of the mobile phone 200**.

The virtual camera capability information may be the camera capability negotiation result. For a specific camera capability negotiation result, refer to step 403. Details are not described herein again.

**414*c*: The virtual camera agent module 204 of the mobile phone 200 sends, to the camera management module 102 of the unscrewed aerial vehicle 100, a request for authorization of the camera of the unscrewed aerial vehicle 100**.

To ensure transmission security of video data shot by the unscrewed aerial vehicle 100, when the unscrewed aerial vehicle 100 grants a control right to the mobile phone 300, the mobile phone 200 provides a photographing function for the mobile phone 300. In other words, the mobile phone 200 can transmit, to the mobile phone 300 only after obtaining authorization of the unscrewed aerial vehicle 100, data received from the unscrewed aerial vehicle 100.

Figure 5:
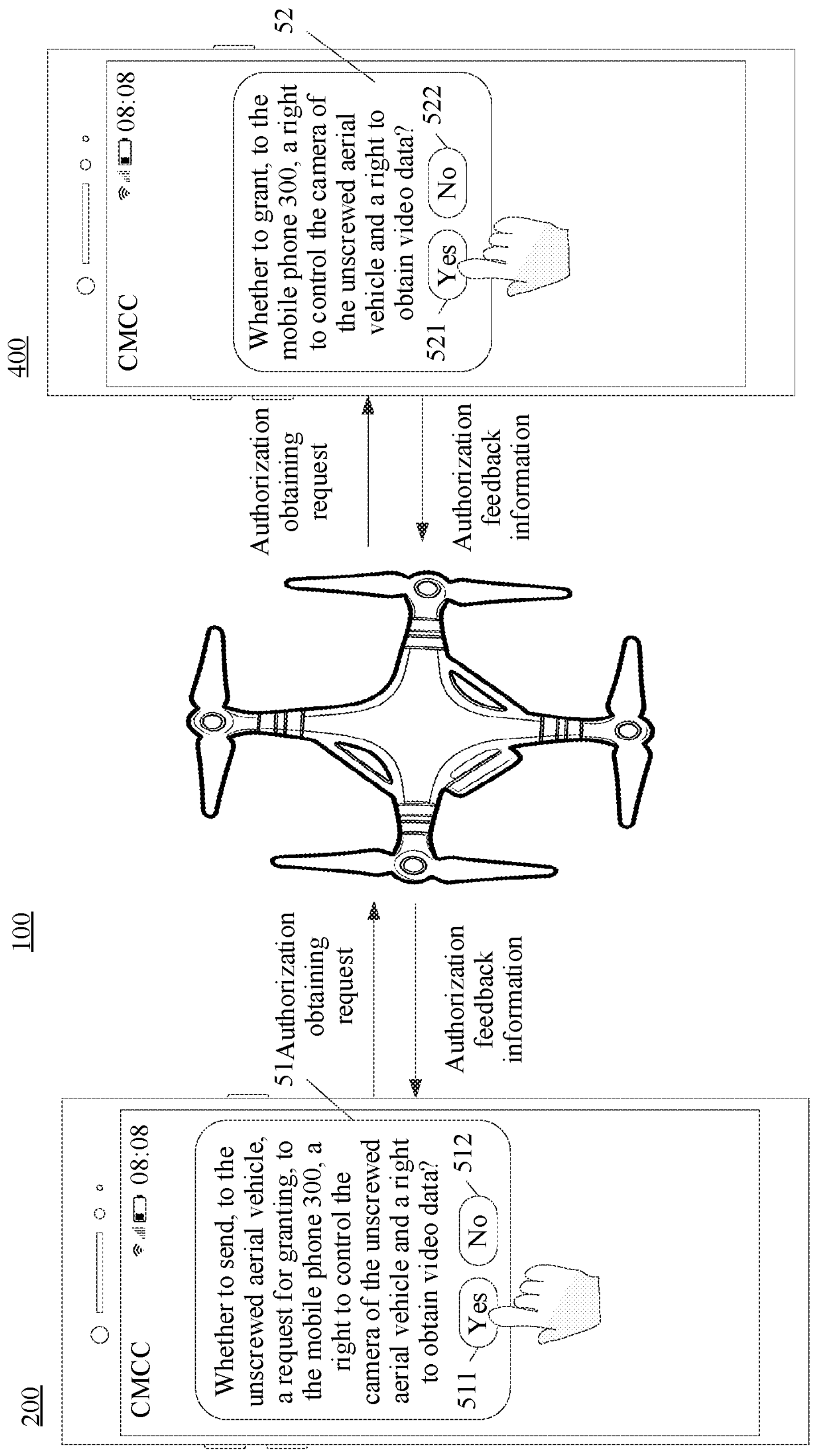
FIG. 5 is a schematic diagram of a process of granting a right to control a camera of an unscrewed aerial vehicle 100 and a data transmission right according to some embodiments of this application.

For example, FIG. 5 is a schematic diagram of a process of granting a right to control a camera of an unscrewed aerial vehicle 100 and a data transmission right according to some embodiments of this application. As shown in FIG. 5, a display interface of the mobile phone 200 displays a prompt box 51, and the prompt box 51 includes a prompt message "Whether to send, to the unscrewed aerial vehicle, a request for granting, to the mobile phone 300, a right to control the camera of the unscrewed aerial vehicle and a right to obtain video data?"; and a "Yes" control 511 and a "No" control 512 for selection by a user.

After the user selects (for example, tapping) the "Yes" control 511, the mobile phone 200 detects the operation and sends an authorization obtaining request to the unscrewed aerial vehicle 100.

**414*d*: The camera management module 102 of the unscrewed aerial vehicle 100 determines whether to indicate authorization; and proceed to 414*e* if the unscrewed aerial vehicle 100 indicates authorization; or if the unscrewed aerial vehicle 100 indicates unauthorization, the camera management module 102 of the unscrewed aerial vehicle 100 sends a camera unauthorization indication of the unscrewed aerial vehicle 100 to the virtual camera agent module 204 of the mobile phone 200**.

Still referring to FIG. 5, after receiving the authorization obtaining request by using the unscrewed aerial vehicle 100, a mobile phone 400 that controls the unscrewed aerial vehicle 100 displays a prompt box 52 in a display interface of the mobile phone 400, and the prompt box 52 includes a prompt message "Whether to grant, to the mobile phone 300, a right to control the camera control of the unscrewed aerial vehicle and a right to obtain video data?"; and a "Yes" control 521 and a "No" control 522 for selection by a user.

After the user selects the "Yes" control 521, the camera management module 102 of the unscrewed aerial vehicle 100 determines that authorization feedback information of the mobile phone 400 is received and indicates authorization, and proceeds to 414*e*. After the user selects the "Yes" control 522, the camera management module 102 of the unscrewed aerial vehicle 100 sends a camera unauthorization indication of the unscrewed aerial vehicle 100 to the virtual camera agent module 204 of the mobile phone 200.

It can be understood that in addition to the mobile phone 400, a device controlling the unscrewed aerial vehicle 100 may further be another control terminal, such as a computer or a remote control. This is not limited herein.

In addition, it can be understood that the nature of the authorization may be temporary authorization (for example, three days) or permanent authorization.

414*e*: The camera management module 102 of the unscrewed aerial vehicle 100 sends a camera authorization indication of the unscrewed aerial vehicle 100 to the virtual camera agent module 204 of the mobile phone 200.

415: The camera virtualization module 303 of the mobile phone 300 configures the camera virtualization module 303 based on the camera capability negotiation result.

Step 415 and step 404 are based on a same inventive concept, and details are not described herein again.

416: The camera virtualization module 303 of the mobile phone 300 sends configuration information of a virtual camera to a virtual camera node management module 305 of the mobile phone 300.

The configuration information of the virtual camera may be configuration time of the camera virtualization module 303 and the camera capability negotiation result used to configure the camera virtualization module 303.

417: The virtual camera node management module 305 of the mobile phone 300 sends, to the virtual camera management module 302 of the mobile phone 300, a notification indicating that the virtual camera is successfully configured.

Before the virtual camera node management module 305 of the mobile phone 300 sends, to the virtual camera management module 302 of the mobile phone 300, the notification indicating that the virtual camera is successfully configured, a data transmission relationship is that the unscrewed aerial vehicle 100 transmits video data shot by the camera to the mobile phone 200.

After the virtual camera node management module 305 of the mobile phone 300 sends, to the virtual camera management module 302 of the mobile phone 300, the notification indicating that the virtual camera is successfully configured, a data transmission relationship is that the unscrewed aerial vehicle 100 transmits the video data shot by the camera to the mobile phone 200, and the mobile phone 200 transmits, to the mobile phone 300, the video data received from the unscrewed aerial vehicle 100.

Therefore, it can be understood that the data transmission relationship update notification includes anew data transmission relationship that the unscrewed aerial vehicle 100 transmits the video data shot by the camera to the mobile phone 200, and the mobile phone 200 transmits, to the mobile phone 300, the video data received from the unscrewed aerial vehicle 100.

The data transmission relationship may be recorded in the following format:

```
{
SourceDevice: unscrewed aerial vehicle 100
Capability: camera
Virtualization Path: unscrewed aerial vehicle 100, mobile phone 200, and mobile
phone 300
}
```

418: After receiving the notification that is sent by the virtual camera node management module 305 of the mobile phone 300 and that indicates that the virtual camera is successfully configured, the virtual camera management module 302 of the mobile phone 300 sends a data transmission relationship update notification to the topology management module 301 of the mobile phone 300.

It can be understood that the data transmission relationship update notification includes a new data transmission relationship that the unscrewed aerial vehicle 100 transmits the video data shot by the camera to the mobile phone 200, and the mobile phone 200 transmits, to the mobile phone 300, the video data received from the unscrewed aerial vehicle 100.

419: After receiving the data transmission relationship update notification sent by the virtual camera management module 302 of the mobile phone 300, the topology management module 301 of the mobile phone 300 sends a data transmission relationship update notification to the topology management module 201 of the mobile phone 200.

It can be understood that the data transmission relationship update notification includes a new data transmission relationship that the unscrewed aerial vehicle 100 transmits the video data shot by the camera to the mobile phone 200, and the mobile phone 200 transmits, to the mobile phone 300, the video data received from the unscrewed aerial vehicle 100.

420: After receiving the data transmission relationship update notification sent by the topology management module 301 of the mobile phone 300, the topology management module 201 of the mobile phone 200 sends a data transmission relationship update notification to the topology management module 101 of the unscrewed aerial vehicle 100.

It can be understood that the data transmission relationship update notification includes a new data transmission relationship that the unscrewed aerial vehicle 100 transmits the video data shot by the camera to the mobile phone 200, and the mobile phone 200 transmits, to the mobile phone 300, the video data received from the unscrewed aerial vehicle 100.

In the conventional technology, virtualization between a plurality of levels of devices is not supported, and therefore a data transmission relationship between the plurality of levels of devices does not need to be managed. However, in this embodiment of this application, on the basis of supporting cascading virtualization, a user may view a current data transmission relationship and manage a device in the data transmission relationship based on an actual requirement (concatenation connection and concatenation termination). Concatenation termination means to support a device participating in the data transmission relationship in exiting the data transmission relationship. If concatenation termination is not supported, as a quantity of devices increases, service implementation difficulty and final user experience continuously deteriorate. Concatenation connection means to support a device that does not participate in the data transmission relationship in joining the data transmission relationship.

Based on implementation of the foregoing distributed capability virtualization, an application phase includes the following.

When the mobile phone 300 detects a user operation of invoking distributed capability virtualization by a user, the mobile phone 300 sends an invoking instruction to the mobile phone 200, and the mobile phone 200 sends an invoking instruction to the unscrewed aerial vehicle based on the invoking instruction sent by the mobile phone 300. Then the unscrewed aerial vehicle 100 may provide a photographing function for the mobile phone 200 based on the invoking instruction sent by the mobile phone 200. To be specific, the mobile phone 200 may control a working status and/or a data transmission status of the unscrewed aerial vehicle 100. For example, the unscrewed aerial vehicle 100 sends video data collected through photographing to the mobile phone 200. For another example, the mobile phone 200 may send a control instruction to the unscrewed aerial vehicle 100, to adjust a photographing field of view, a photographing angle, or the like of the unscrewed aerial vehicle 100.

The mobile phone 200 provides the photographing function of the unscrewed aerial vehicle for the mobile phone 300 based on the invoking instruction sent by the mobile phone 300. To be specific, the mobile phone 300 may control the working status and/or the data transmission status of the unscrewed aerial vehicle 100 by using the mobile phone 200. For example, the mobile phone 200 sends, to the mobile phone 300, the video data received from the unscrewed aerial vehicle 100. For another example, the mobile phone 300 may send a control instruction to the unscrewed aerial vehicle 100 by using the mobile phone 200, to adjust a photographing field of view, a photographing angle, or the like of the unscrewed aerial vehicle 100. For another example, the mobile phone 300 may send a control instruction to the mobile phone 200, to control a video data sending status of the mobile phone 200, for example, temporarily stopping sending video data or disabling a video data sending function.

Based on implementation of the foregoing distributed capability virtualization, the embodiments of this application provide two concatenation termination manners. One manner is that a source device initiates concatenation termination, to be specific, an original device that provides an original physical component capability initiates a virtualization termination process. In this case, devices on an entire virtual chain complete virtual capability termination one by one, and finally all the devices exit virtualization.

Figure 6:
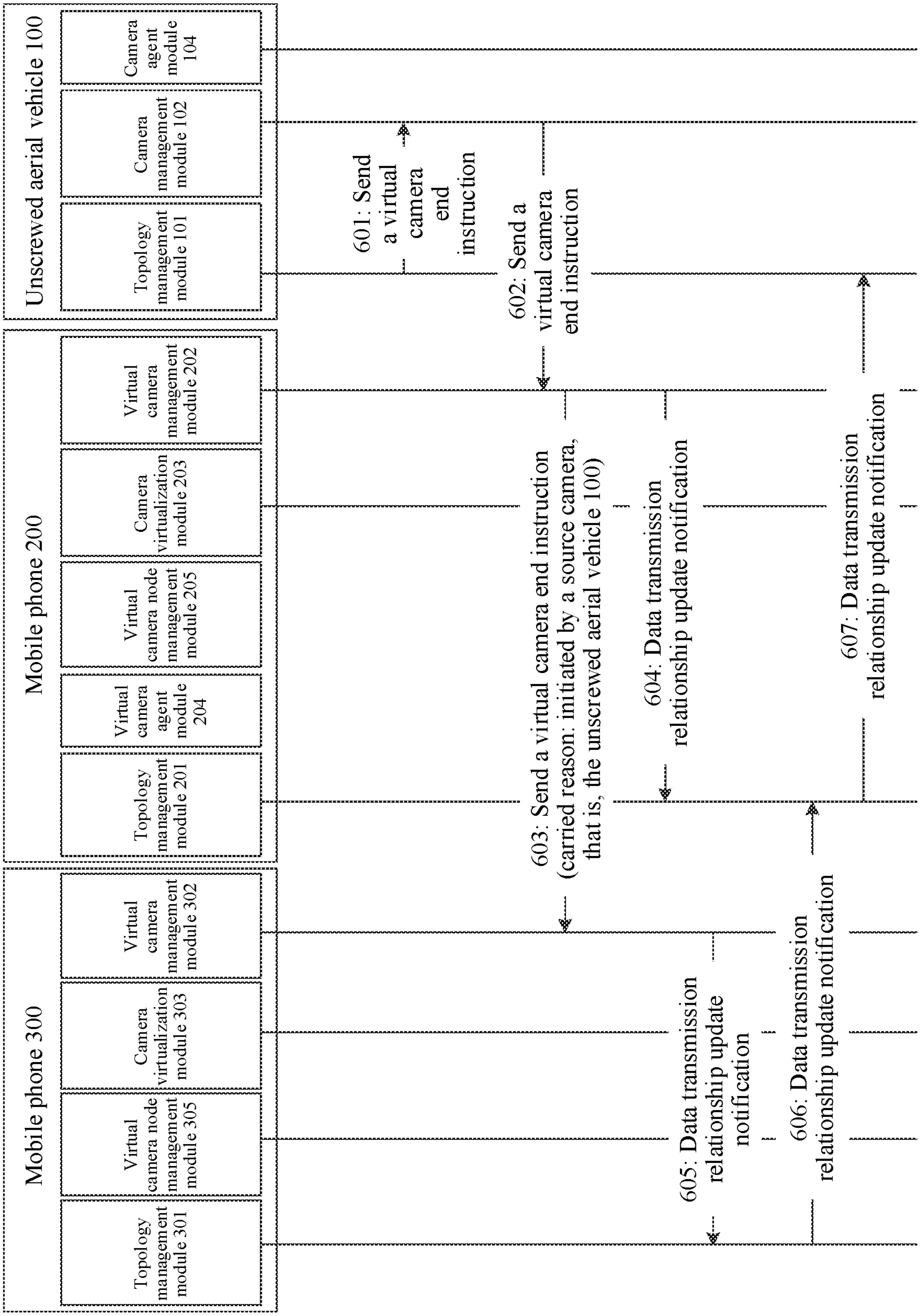
FIG. 6 is a schematic diagram of a concatenation termination procedure initiated by an unscrewed aerial vehicle 100 according to some embodiments of this application.

FIG. 6 is a schematic diagram of a concatenation termination procedure initiated by an unscrewed aerial vehicle 100 according to some embodiments of this application. As shown in FIG. 6, the procedure includes the following steps.

601: The topology management module 101 of the unscrewed aerial vehicle 100 sends a virtual camera end instruction to the camera management module 102 of the unscrewed aerial vehicle 100.

It can be understood that after the foregoing distributed capability virtualization is implemented, a user may query a data transmission relationship on the unscrewed aerial vehicle 100, the mobile phone 200, and the mobile phone 300; dynamically remove, based on a user requirement, a device participating in the data transmission relationship; and when an intermediate device exits the data transmission relationship, establish a data transmission relationship between two devices connected to the intermediate device, to ensure continuity of a data transmission service.

602: The camera management module 102 of the unscrewed aerial vehicle 100 sends a virtual camera end instruction to the virtual camera management module 202 of the mobile phone 200.

603: The virtual camera management module 202 of the mobile phone 200 sends a virtual camera end instruction to the virtual camera management module 302 of the mobile phone 300, where the instruction carries a reason "initiated by a source device, that is, the unscrewed aerial vehicle 100".

604: The virtual camera management module 202 of the mobile phone 200 sends a data transmission relationship update notification to the topology management module 201 of the mobile phone 200.

It can be understood that the data transmission relationship update notification is that a data relationship is empty, that is, a video data transmission relationship between the unscrewed aerial vehicle 100, the mobile phone 200, and the mobile phone 300 ends.

605: The virtual camera management module 302 of the mobile phone 300 sends a data transmission relationship update notification to the topology management module 301 of the mobile phone 300.

It can be understood that the data transmission relationship update notification is that a data relationship is empty, that is, a video data transmission relationship between the unscrewed aerial vehicle 100, the mobile phone 200, and the mobile phone 300 ends.

606: The topology management module 301 of the mobile phone 300 sends a data transmission relationship update notification to the topology management module 201 of the mobile phone 200.

It can be understood that the data transmission relationship update notification is that a data relationship is empty, that is, a video data transmission relationship between the unscrewed aerial vehicle 100, the mobile phone 200, and the mobile phone 300 ends.

607: The topology management module 201 of the mobile phone 200 sends a data transmission relationship update notification to the topology management module 101 of the unscrewed aerial vehicle 100.

It can be understood that the data transmission relationship update notification is that a data relationship is empty, that is, a video data transmission relationship between the unscrewed aerial vehicle 100, the mobile phone 200, and the mobile phone 300 ends.

The other manner is that an intermediate device initiates connection after termination, to be specific, only a virtual capability of the intermediate device is terminated, and an upper-level device is connected to a lower-level device, to continue to complete device capability virtualization. For example, a level-2 device (the mobile phone 300) initiates connection after termination, a level-1 device (the mobile phone 200) ends virtualization, and a source device (the unscrewed aerial vehicle 100) is connected to the level-2 device (the mobile phone 300), so that when the level-1 device is compressed, it is ensured that virtual services of the original level-2 device (the mobile phone 300) and a new level-1 device (the mobile phone 200) are not interrupted. Compared with a case in which when the virtual capability of only the intermediate device is terminated, a series of operations such as authorization need to re-appear between the level-2 device (the mobile phone 300) and the source device (the unscrewed aerial vehicle 100) to establish a communication connection relationship, this simplifies a procedure for establishing a virtual capability communication relationship between the level-2 device (the mobile phone 300) and the source device (the unscrewed aerial vehicle 100).

Figure 7A:
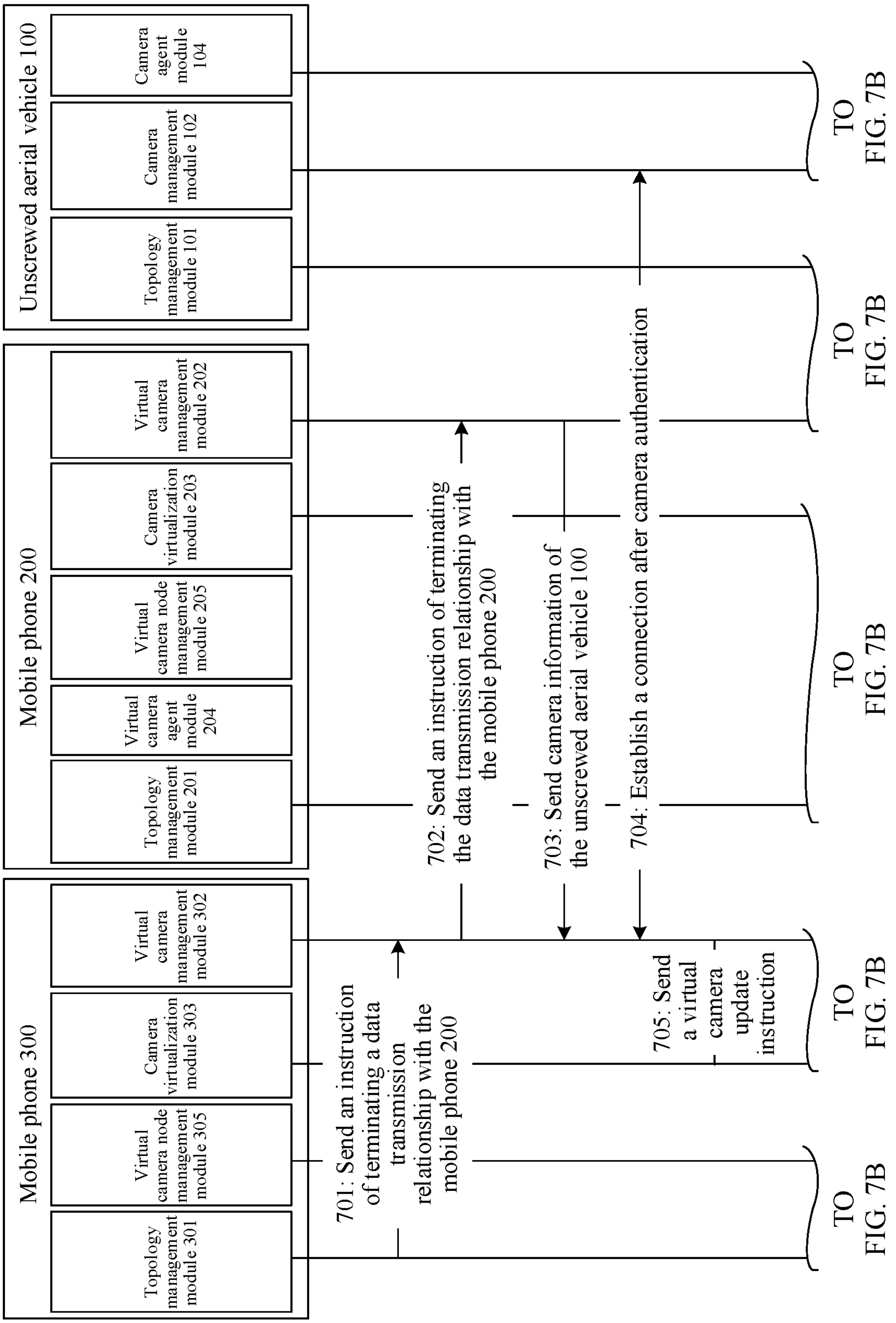
FIG. 7A and FIG. 7B are a schematic diagram of a concatenation termination procedure initiated by an intermediate device, that is, a mobile phone 200, according to some embodiments of this application.
Figure 7B:
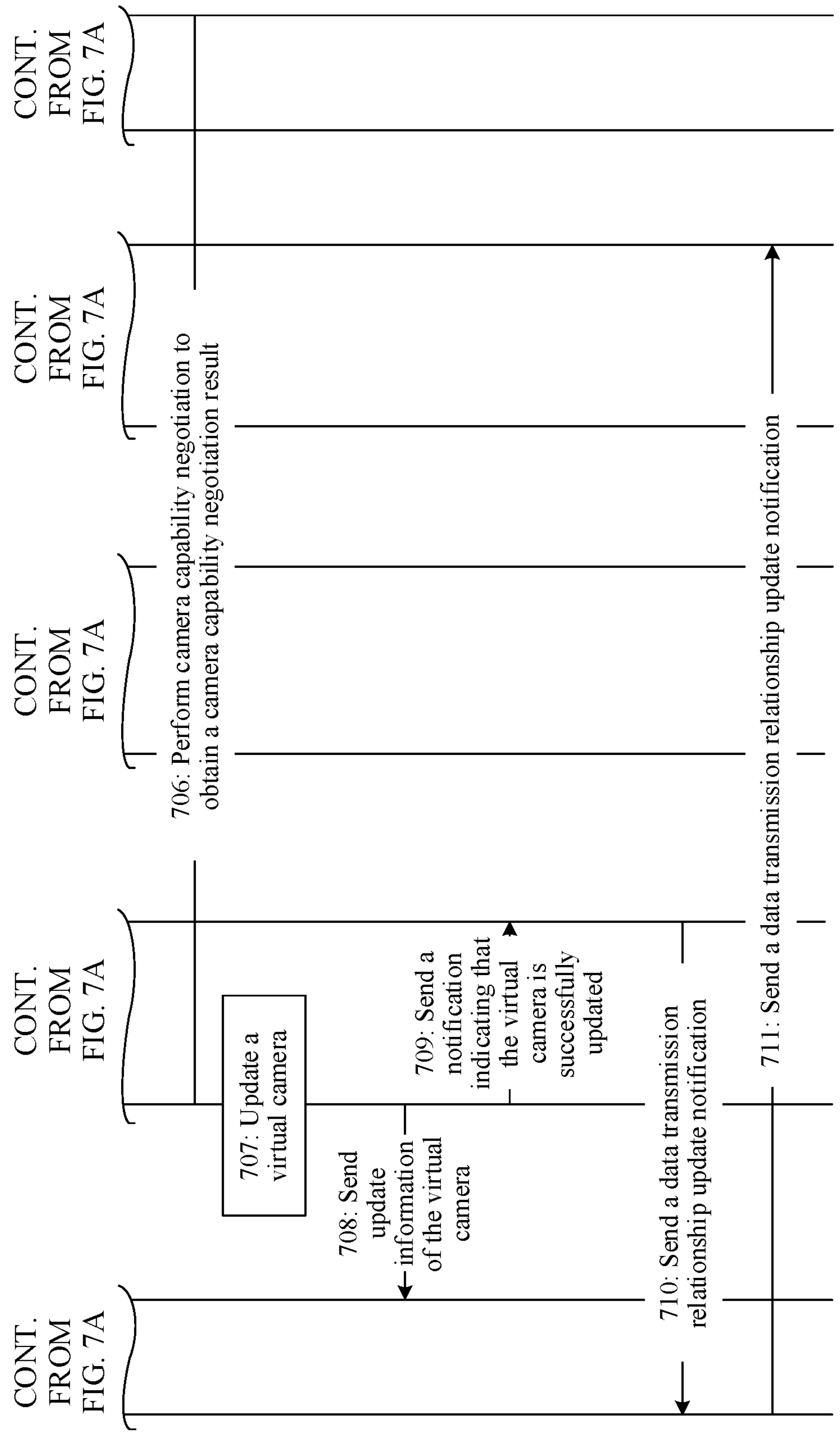

FIG. 7A and FIG. 7B are a schematic diagram of a concatenation termination procedure initiated by an intermediate device, that is, a mobile phone 200, according to some embodiments of this application. As shown in FIG. 7A and FIG. 7B, the procedure includes the following steps.

701: The topology management module 301 of the mobile phone 300 sends an instruction of terminating a data transmission relationship between the mobile phone 300 and the mobile phone 200 to the virtual camera management module 302 of the mobile phone 300.

702: The virtual camera management module 302 of the mobile phone 300 sends an instruction of terminating the data transmission relationship between the mobile phone 300 and the mobile phone 200 to the virtual camera management module 202 of the mobile phone 200.

703: The virtual camera management module 202 of the mobile phone 200 sends device information of the unscrewed aerial vehicle 100 to the virtual camera management module 302 of the mobile phone 300.

It can be understood that after the data transmission relationship used by the mobile phone 200 to send video data shot by the unscrewed aerial vehicle to the mobile phone 300 is terminated, the mobile phone 300 may establish a data transmission relationship with the unscrewed aerial vehicle that provides a photographing capability for the mobile phone 200. Therefore, the mobile phone 200 sends the device information of the unscrewed aerial vehicle 100 to the mobile phone 300, so that the mobile phone 300 re-establishes a data transmission relationship with the unscrewed aerial vehicle 100.

The device information of the unscrewed aerial vehicle 100 may be an IP address, a MAC address, a device ID, or a device connection manner (for example, a Wi-Fi connection, a Wi-Fi P2P connection, a Bluetooth connection, or a short-range wireless connection) between the unscrewed aerial vehicle 100 and the mobile phone 200 that can be used to establish a wireless communication connection relationship between the mobile phone 200 and the unscrewed aerial vehicle 100.

704: The virtual camera management module 302 of the mobile phone 300 and the camera management module 102 of the unscrewed aerial vehicle establish a connection relationship after device authentication.

It can be understood that because the mobile phone 300 has obtained the device information of the unscrewed aerial vehicle 100 that provides the photographing capability, a wireless connection relationship may be established between the mobile phone 300 and the unscrewed aerial vehicle 100 through near field communication (for example, Wi-Fi or Bluetooth). For example, the virtual camera management module 302 of the mobile phone 300 directly sends a wireless connection request to the unscrewed aerial vehicle 100, and the camera management module 102 of the unscrewed aerial vehicle 100 sends response feedback to the mobile phone 200, so that a wireless communication relationship is established between the mobile phone 200 and the unscrewed aerial vehicle 100.

705: The virtual camera management module 302 of the mobile phone 300 sends a virtual camera update instruction to the camera virtualization module 303 of the mobile phone 300.

It can be understood that the virtual camera update instruction is used to instruct the mobile phone 300 to update the camera virtualization module 303, that is, configure the camera virtualization module 303 based on a result of camera capability negotiation between the mobile phone 300 and the unscrewed aerial vehicle 100. The following further describes a camera capability negotiation result.

706: The camera virtualization module 303 of the mobile phone 300 and the camera agent module 104 of the unscrewed aerial vehicle perform device capability negotiation, to obtain a device capability negotiation result.

A technical means of step 706 is the same as that of step 403, and details are not described herein again.

707: The camera virtualization module 303 of the mobile phone 300 updates a virtual camera based on the device capability negotiation result.

A technical means of step 707 is the same as that of step 404, and details are not described herein again.

708: The camera virtualization module 303 of the mobile phone 300 sends update information of the virtual camera to the virtual camera node management module 305 of the mobile phone 300.

It can be understood that the update information of the virtual camera may be configuration time of the camera virtualization module 303 and the camera capability negotiation result used to configure the camera virtualization module 303. In this way, when a data transmission relationship is subsequently established between another device and the mobile phone 300, the another device may directly obtain, from the virtual camera node management module 305, the result of camera capability negotiation between the mobile phone 300 and the unscrewed aerial vehicle 100, to configure a camera virtualization module of the another device, thereby reducing time for establishing the data transmission relationship between the another device and the mobile phone 300, and improving efficiency of establishing the data transmission relationship between the another device and the mobile phone 300.

709: The camera virtualization module 303 of the mobile phone 300 sends, to the virtual camera management module 302 of the mobile phone 300, a notification indicating that the virtual camera is successfully updated.

It can be understood that the data transmission relationship update notification includes a new data transmission relationship that the unscrewed aerial vehicle 100 transmits video data shot by the camera to the mobile phone 300.

710: The virtual camera management module 302 of the mobile phone 300 sends a data transmission relationship update notification to the topology management module 301 of the mobile phone 300.

It can be understood that the data transmission relationship update notification includes a new data transmission relationship that the unscrewed aerial vehicle 100 transmits the video data shot by the camera to the mobile phone 300.

After the concatenation termination process and the concatenation connection process end, an updated data transmission relationship may be recorded in the following format:

```
{
SourceDevice: unscrewed aerial vehicle 100
Capability: camera
Virtualization Path: unscrewed aerial vehicle 100 and mobile phone 300
}
```

711: The topology management module 301 of the mobile phone 300 sends a data transmission relationship update notification to the topology management module 101 of the unscrewed aerial vehicle 100.

It can be understood that the data transmission relationship update notification includes a new data transmission relationship that the unscrewed aerial vehicle 100 transmits the video data shot by the camera to the mobile phone 300.

Figure 8:
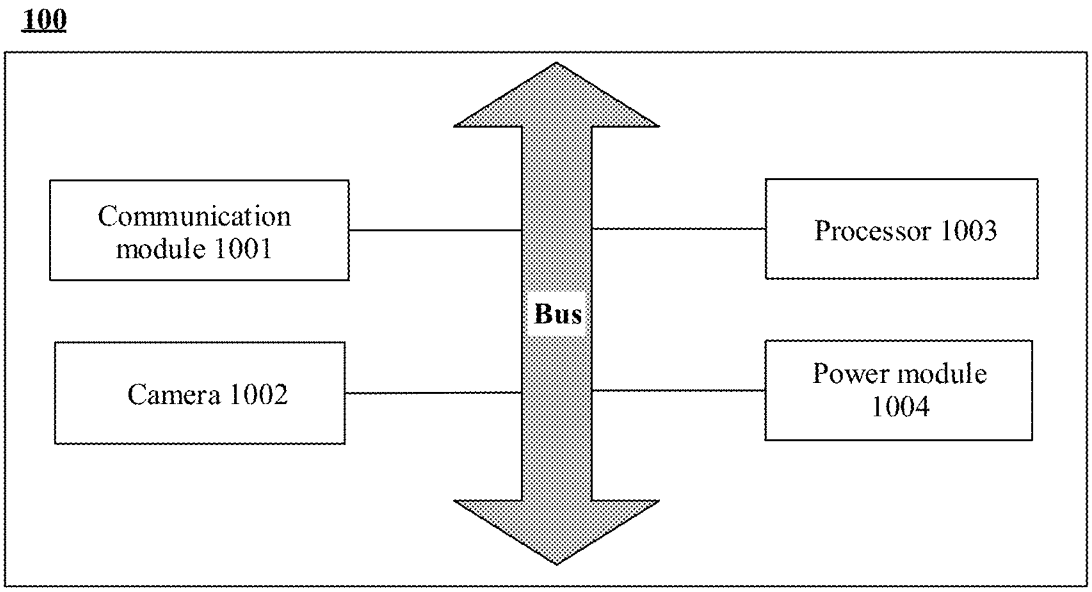
FIG. 8 is a schematic diagram of a structure of an unscrewed aerial vehicle 100 for implementing technical solutions in this application according to some embodiments of this application.

FIG. 8 is a schematic diagram of a structure of an unscrewed aerial vehicle 100 for implementing technical solutions in this application according to some embodiments of this application.

FIG. 8 is a schematic diagram of a structure of an unscrewed aerial vehicle 100 disclosed according to an embodiment of this application. The unscrewed aerial vehicle 100 may include a communication module 1001, a camera 1002, a processor 1003, a power module 1004, and the like.

It can be understood that the structure shown in this embodiment of this application does not constitute a specific limitation on the unscrewed aerial vehicle 100. In some other embodiments of this application, the unscrewed aerial vehicle 100 may include more or fewer components than those shown in the figure, or combine some components, or split some components, or have different component arrangements. The components shown in the figure may be implemented by hardware, software, or a combination of software and hardware.

The communication module 1001 may include an antenna, and transmit and receive an electromagnetic wave by using the antenna. The wireless communication module 1001 may provide a solution for wireless communication including a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like applied to the unscrewed aerial vehicle 100. The unscrewed aerial vehicle 100 may communicate with a network and another device by using a wireless communication technology. In this embodiment of this application, the unscrewed aerial vehicle 100 may communicate with the mobile phone 200 by using the communication module 1001, and send shot video data to the mobile phone 200.

The processor 1003 may include one or more processing units, for example, may include a processing module or processing circuit such as a CPU, an ISP, a graphics processing unit (GPU), a DSP, a microprocessor (MCU), an artificial intelligence (AI) processor, or a programmable logic device (FPGA). Different processing units may be independent components, or may be integrated into one or more processors. A storage unit may be disposed in the processor 1003, and is configured to store instructions and data.

The camera 1002 is configured to capture a static image or a video. In this embodiment of this application, the camera 1002 is configured to collect video data.

The power module 1004 may include a power supply, a power management component, and the like. The power supply may be a battery. The power management component is configured to manage charging of the power supply and power supply to another module performed by the power supply. In some embodiments, the power management component includes a charging management module and a power management module. The charging management module is configured to receive charging input from a charger. The power management module is configured to connect to the power supply, the charging management module, and the processor 1002. The power management module receives input of the power supply and/or input of the charging management module, and supplies power to the processor 1003, the camera 1002, the communication module 1001, and the like.

Figure 9:
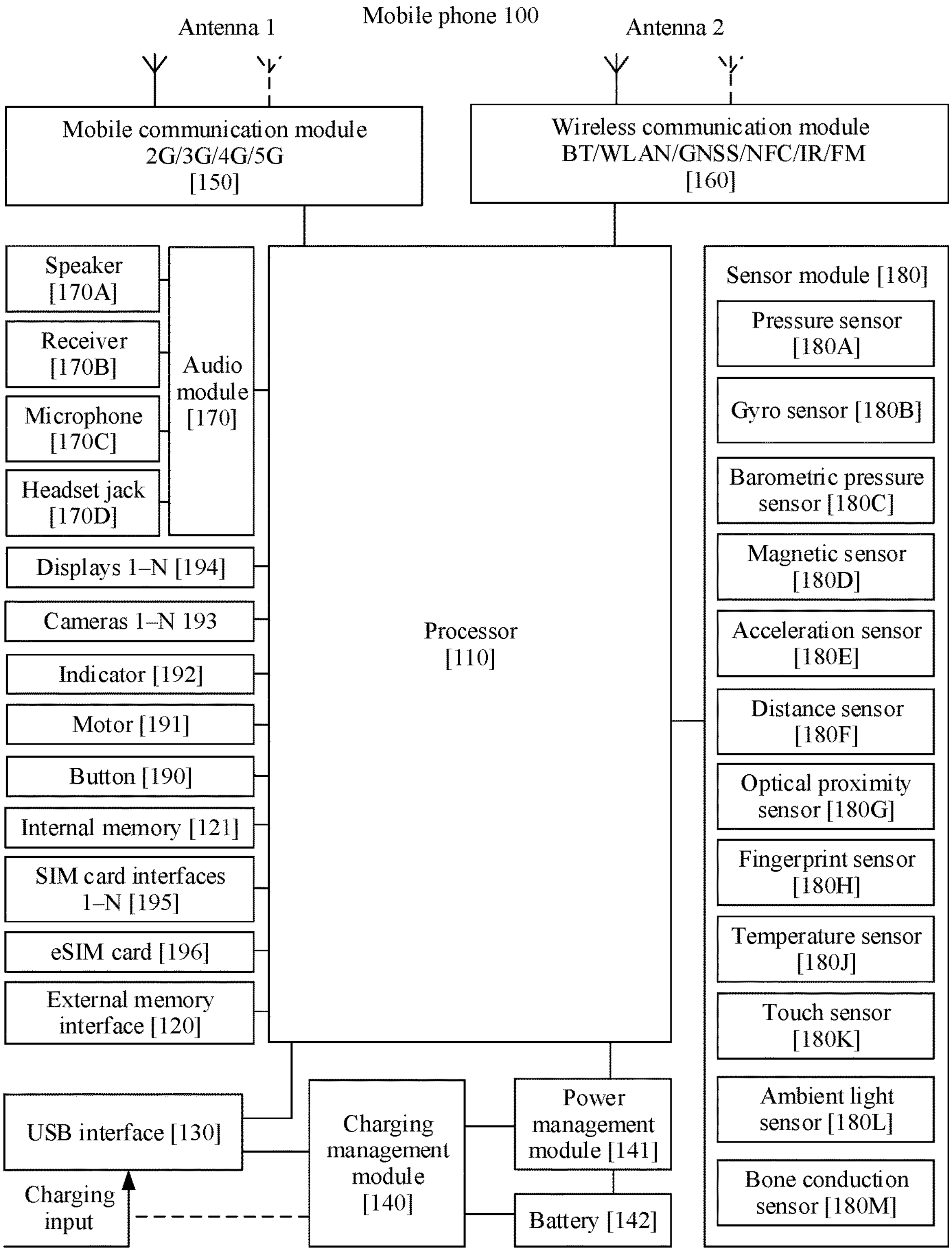
FIG. 9 is a schematic diagram of a structure of a mobile phone 200 for implementing technical solutions in this application according to some embodiments of this application.

FIG. 9 is a schematic diagram of a structure of a mobile phone 200 for implementing technical solutions in this application according to some embodiments of this application. As shown in FIG. 9, the mobile phone 200 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, an eSIM card 196, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this application does not constitute a specific limitation on the mobile phone 200. In some other embodiments of this application, the mobile phone 200 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

A wireless communication function of the mobile phone 200 may be implemented by using the antenna 1, the antenna 2, the mobile communication module 150, the wireless communication module 160, the modem processor, the baseband processor, and the like. In this embodiment of this application, the mobile phone 200 may interact with the unscrewed aerial vehicle 100 by using these modules, to obtain video data from the unscrewed aerial vehicle 100.

The mobile phone 200 may further interact with the mobile phone 300, and the mobile phone 200 sends the video data to the mobile phone 300.

The mobile phone 200 implements a display function by using the GPU, the display 194, the application processor, and the like. The GPU is a microprocessor for image processing, and is connected to the display 194 and the application processor. The GPU is configured to perform mathematical and geometric calculation for image rendering. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini LED, a micro LED, a micro OLED, a quantum dot light-emitting diode (QLED), or the like. In some embodiments, the mobile phone 200 may include one or N displays 194, where N is a positive integer greater than 1. In this embodiment of this application, a video may be displayed based on the video data obtained from the unscrewed aerial vehicle 100.

The mobile phone 200 may implement a photographing function by using the ISP, the camera 193, the video codec, the GPU, the display 194, the application processor, and the like.

The external memory interface 120 may be configured to connect to an external storage card, for example, a micro SD card, to extend a storage capability of the mobile phone 200. The external storage card communicates with the processor 110 by using the external memory interface 120, to implement a data storage function. For example, files such as videos are stored in the external storage card.

The internal memory 121 may be configured to store computer-executable program code. The executable program code includes instructions. The internal memory 121 may include a program storage area and a data storage area. The program storage area may store an operating system, an application program required by at least one function (for example, a sound play function or an image play function), and the like. The data storage area may store data (for example, audio data or a phone book) created during use of the mobile phone 200, and the like. In addition, the internal memory 121 may include a high-speed random access memory, and may further include a non-volatile memory, for example, at least one magnetic disk storage device, a flash memory, or a universal flash storage (UFS). The processor 110 runs the instructions stored in the internal memory 121 and/or the instructions stored in the memory disposed in the processor, to execute various function applications and data processing of the mobile phone 200.

The SIM card interface 195 is configured to connect to a SIM card. The SIM card may be inserted into the SIM card interface 195 or removed from the SIM card interface 195, to implement contact with or separation from the mobile phone 200. The mobile phone 200 may support one or N SIM card interfaces, where N is a positive integer greater than 1. The SIM card interface 195 may support a nano SIM card, a micro SIM card, a SIM card, and the like. A plurality of cards may be simultaneously inserted into a same SIM card interface 195. The plurality of cards may be of a same type or different types. The SIM card interface 195 may also be compatible with different types of SIM cards. The SIM card interface 195 may also be compatible with an external storage card.

In some embodiments, the mobile phone 200 further includes the eSIM card 196, namely, an embedded SIM card. The eSIM card 196 may be embedded in the mobile phone 200, and cannot be separated from the mobile phone 200. The eSIM card 196 may be integrated in a system on chip (SOC) chip, a modem chip, or a near field communication (NFC) chip of the mobile phone. This is not limited in this embodiment of this application.

A software system of the mobile phone 200 may use a layered architecture, an event-driven architecture, a micro-kernel architecture, a micro service architecture, or a cloud architecture. In this embodiment of the present application, an Android system with a layered architecture is used as an example to describe a software structure of the mobile phone 200.

Figure 10:
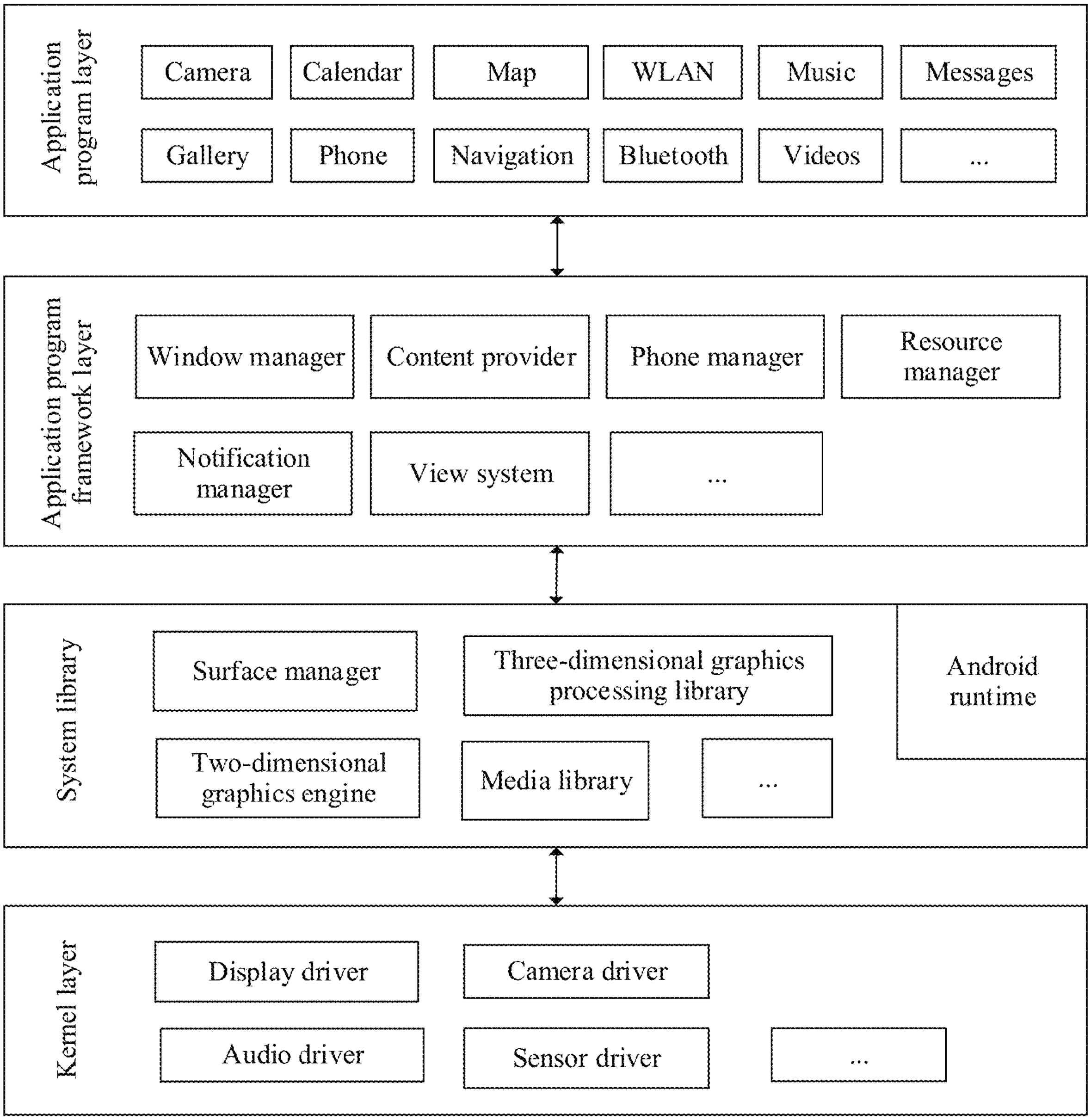
FIG. 10 is a block diagram of a software structure of a mobile phone 200 according to some embodiments of this application.

FIG. 10 is a block diagram of a software structure of a mobile phone 200 according to some embodiments of this application.

The layered architecture divides software into several layers, and each layer has a clear role and task. The layers communicate with each other through a software interface. In some embodiments, the Android system is divided into four layers from top to down: an application program layer, an application program framework layer, an Android runtime and system library (which may alternatively be a hardware abstraction layer), and a kernel layer.

The application program layer may include a series of application program packages. As shown in FIG. 10, the application program packages may include application programs such as Shopping, News, Camera, Gallery, Calendar, Phone, Map, Navigation, WLAN, Bluetooth, Music, Videos, and Messages. The application program framework layer provides an application programming interface (API) and a programming framework for an application program in the application program layer. The application program framework layer includes some predefined functions.

As shown in FIG. 10, the application program framework layer may include a window manager, a content provider, a view system, a phone manager, a resource manager, a notification manager, and the like.

The view system includes a visual control, such as a control for displaying text or a control for displaying a picture. The view system may be configured to construct an application program. A display interface may include one or more views. For example, a display interface including an SMS message notification icon may include a view for displaying text and a view for displaying a picture.

The notification manager enables an application program to display notification information in a status bar, and may be configured to convey a message of a notification type. The message can automatically disappear after a short stay without user interaction. For example, the notification manager is configured to notify download completion, give a message reminder, and the like. The notification manager may alternatively be a notification that appears in a top status bar of the system in a form of a graph or scroll bar text, for example, may be a notification of an application program running in the background, or may be a notification that appears on a screen in a form of a dialog window. For example, text information is prompted in the status bar, a prompt tone is played, an electronic device vibrates, or an indicator light blinks.

The Android runtime includes a kernel library and a virtual machine. The Android runtime is responsible for scheduling and managing the Android system.

The kernel library includes two parts: One part is a functional function that needs to be invoked by Java language, and the other part is a kernel library of Android.

The application program layer and the application program framework layer are run on the virtual machine. The virtual machine executes Java files in the application program layer and the application program framework layer as binary files. The virtual machine is configured to implement functions such as object lifecycle management, stack management, thread management, security and exception management, and garbage collection.

The system library may include a plurality of functional modules, for example, a virtual camera module, a surface manager, a media library (Media Libraries), a three-dimensional graphics processing library (for example, OpenGL ES), and a 2D graphics engine (for example, SGL).

The kernel layer is a layer between hardware and software. The kernel layer includes at least a display driver, a camera driver, an audio driver, and a sensor driver.

In some cases, the disclosed embodiments may be implemented by hardware, firmware, software, or any combination thereof. The disclosed embodiments may alternatively be implemented as instructions carried or stored in one or more temporary or non-temporary machine-readable (for example, computer-readable) storage media, and the instructions may be read and executed by one or more processors. For example, the instructions may be distributed through a network or another computer-readable medium. Therefore, the machine-readable medium may include any mechanism used to store or transmit information in a machine-readable (for example, computer-readable) form, including but not limited to a floppy disk, a compact disc, an optical disc, a compact disc read-only memory (CD-ROM), a magneto-optical disk, a read-only memory (ROM), a random access memory (RAM), an erasable programmable read-only memory (EPROM), an electrically erasable programmable read-only memory (EEPROM), a magnetic card or an optical card, a flash memory, or a tangible machine-readable memory used to transmit information (for example, a carrier, an infrared signal, or a digital signal) by using a propagation signal in an electrical, optical, acoustic, or another form over the Internet. Therefore, the machine-readable medium includes any type of machine-readable medium that is suitable for storing or transmitting electronic instructions or information in a machine-readable (for example, computer-readable) form.

Although this application is illustrated and described with reference to some embodiments of this application, a person of ordinary skill in the art should understand that various changes may be made to this application in form and detail without departing from the spirit and scope of this application.

What is claimed is:

1. A distributed device capability virtualization method, comprising:

establishing, by a first electronic device, a first-level communication relationship with a second electronic device, wherein the first-level communication relationship is used to indicate to the first electronic device to provide a preset capability for the second electronic device, wherein the preset capability comprises a photographing capability;

sending, by a third electronic device, a second-level communication relationship establishment request to the second electronic device, wherein the second-level communication relationship establishment request is used by the third electronic device to obtain, from the second electronic device, authorization to use the preset capability by using the second electronic device;

in response to the second electronic device granting, based on the second-level communication relationship establishment request, establishment of a second-level communication relationship with the second electronic device to the third electronic device, establishing, by the third electronic device, the second-level communication relationship with the second electronic device, wherein the second-level communication relationship is used to indicate to the third electronic device to use the preset capability by using the second electronic device; and combining, by the third electronic device, image data obtained from the third electronic device and image data collected from the photographing capability.

2. The method according to claim 1, wherein the method further comprises:

in response to the third electronic device sending a first invoking instruction to the second electronic device, and the second electronic device sending a second invoking instruction to the first electronic device based on the first invoking instruction, providing, by the first electronic device, the preset capability for the second electronic device based on the second invoking instruction; and providing, by the second electronic device, the preset capability for the third electronic device based on the first invoking instruction.

3. The method according to claim 2, wherein the providing, by the first electronic device, the preset capability for the second electronic device based on the second invoking instruction and the providing, by the second electronic device, the preset capability for the third electronic device based on the first invoking instruction comprises:

sending, by the first electronic device to the second electronic device, first data generated during implementation of the preset capability; and sending, by the second electronic device to the third electronic device, the first data received from the first electronic device.

4. The method according to claim 2, wherein the providing, by the first electronic device, the preset capability for the second electronic device based on the second invoking instruction the and providing, by the second electronic device, the preset capability for the third electronic device based on the first invoking instruction comprises:

sending, by the third electronic device to the second electronic device, second data generated during implementation of the preset capability; and sending, by the second electronic device to the first electronic device, the second data received from the third electronic device.

5. The method according to claim 1, wherein the preset capability comprises one or more of an audio play capability, or an audio collection capability.

6. The method according to claim 1, wherein the method further comprises:

in response to the third electronic device obtaining an instruction of establishing a third-level communication relationship with the first electronic device, and the third electronic device sending a second-level communication relationship termination instruction to the second electronic device based on the third-level communication relationship establishment instruction, sending, by the second electronic device, device information of the first electronic device to the third electronic device based on the second-level communication relationship termination instruction, and disabling the second-level communication relationship; and establishing, by the third electronic device, the third-level communication relationship with the first electronic device based on the device information of the first electronic device, wherein the third-level communication relationship is used to indicate to the first electronic device to provide the preset capability for the third electronic device.

7. A distributed device capability virtualization method, comprising:

receiving, by a second electronic device, a second-level communication relationship establishment request sent by a third electronic device;

granting, by the second electronic device based on the second-level communication relationship establishment request, establishment of a second-level communication relationship with the second electronic device to the third electronic device;

establishing, by the second electronic device, the second-level communication relationship with the third electronic device, wherein the second-level communication relationship is used to indicate to the third electronic device to use a preset capability of a first electronic device by using the second electronic device, wherein the preset capability comprises a photographing capability; and combining, by the third electronic device, image data obtained from the third electronic device and image data collected from the photographing capability.

8. The method according to claim 7, wherein the method further comprises:

in response to the second electronic device receiving a first invoking instruction sent by the third electronic device, and the second electronic device sending a second invoking instruction to the first electronic device based on the first invoking instruction, providing, by the second electronic device, the preset capability for the third electronic device based on the first invoking instruction.

9. The method according to claim 8, wherein the providing, by the second electronic device, the preset capability for the third electronic device based on the first invoking instruction comprises:

sending, by the second electronic device to the third electronic device, first data received from the first electronic device.

10. The method according to claim 8, wherein the providing, by the second electronic device, the preset capability for the third electronic device based on the first invoking instruction comprises:

sending, by the second electronic device to the first electronic device, second data received from the third electronic device.

11. The method according to claim 7, wherein the preset capability comprises one or more of an audio play capability, or an audio collection capability.

12. The method according to claim 7, wherein the method further comprises:

in response to the third electronic device obtaining an instruction of establishing a third-level communication relationship with the first electronic device, and the third electronic device sending a second-level communication relationship termination instruction to the second electronic device based on the third-level communication relationship establishment instruction, sending, by the second electronic device, device information of the first electronic device to the third electronic device based on the second-level communication relationship termination instruction, and disabling the second-level communication relationship.

13. A second electronic device, comprising:

a memory configured to store program instructions;

a processor configured to execute the program instructions to cause the second electronic device to perform:

receiving a second-level communication relationship establishment request sent by a third electronic device;

granting, based on the second-level communication relationship establishment request, establishment of a second-level communication relationship with the second electronic device to the third electronic device;

establishing the second-level communication relationship with the third electronic device, wherein the second-level communication relationship is used to indicate to the third electronic device to use a preset capability of a first electronic device by using the second electronic device, wherein the preset capability comprises a photographing capability; and combining, by the third electronic device, image data obtained from the third electronic device and image data collected from the photographing capability.

14. The device according to claim 13, wherein the processor is further configured to execute the program instructions to cause the second electronic device to perform:

in response to receiving a first invoking instruction sent by the third electronic device, sending a second invoking instruction to the first electronic device based on the first invoking instruction;

providing the preset capability for the third electronic device based on the first invoking instruction.

15. The device according to claim 14, wherein the processor is further configured to execute the program instructions to cause the second electronic device to perform:

sending first data received from the first electronic device to the third electronic device.

16. The device according to claim 14, wherein the processor is further configured to execute the program instructions to cause the second electronic device to perform:

sending second data received from the third electronic device to the first electronic device.

17. The device according to claim 13, wherein the preset capability comprises one or more of an audio play capability, or an audio collection capability.

18. The device according to claim 13, wherein the processor is further configured to execute the program instructions to cause the second electronic device to perform:

in response to the third electronic device obtaining an instruction of establishing a third-level communication relationship with the first electronic device, and receiving a second-level communication relationship termination instruction from the third device based on the third-level communication relationship establishment instruction, sending device information of the first electronic device to the third electronic device based on the second-level communication relationship termination instruction, and disabling the second-level communication relationship.

* * * * *